(12) United States Patent
Mori et al.

(10) Patent No.: US 12,546,629 B2
(45) Date of Patent: Feb. 10, 2026

(54) ANGLE DETECTION APPARATUS

(71) Applicant: Mitsubishi Electric Corporation, Tokyo (JP)

(72) Inventors: Tatsuya Mori, Tokyo (JP); Hiroko Ikeda, Tokyo (JP); Toshihiro Matsunaga, Tokyo (JP); Kenji Ikeda, Tokyo (JP); Kenta Kubo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 293 days.

(21) Appl. No.: 17/791,993

(22) PCT Filed: Feb. 6, 2020

(86) PCT No.: PCT/JP2020/004520
§ 371 (c)(1),
(2) Date: Jul. 11, 2022

(87) PCT Pub. No.: WO2021/157000
PCT Pub. Date: Aug. 12, 2021

(65) Prior Publication Data
US 2023/0194313 A1    Jun. 22, 2023

(51) Int. Cl.
*G01D 5/244* (2006.01)
*G01D 5/20* (2006.01)

(52) U.S. Cl.
CPC ....... *G01D 5/24476* (2013.01); *G01D 5/2046* (2013.01)

(58) Field of Classification Search
CPC .... G01D 5/2046; G01D 5/24476; G01D 1/00; G01D 3/00; G01D 4/00; G01D 5/00;
(Continued)

(56) References Cited

U.S. PATENT DOCUMENTS

2009/0167296 A1* 7/2009 Yokokawa ........... G01D 5/2449
324/207.25
2013/0187582 A1* 7/2013 Nishimura ................ H02P 6/10
318/400.14
(Continued)

FOREIGN PATENT DOCUMENTS

CN         108369112 A    8/2018
EP          3916361 A1   12/2021
(Continued)

OTHER PUBLICATIONS

Office Action dated Oct. 11, 2022 issued by the Japanese Patent Office in Japanese Application No. 2021-575179.
(Continued)

*Primary Examiner* — Judy Nguyen
*Assistant Examiner* — Brent J Andrews
(74) *Attorney, Agent, or Firm* — Sughrue Mion, PLLC

(57) ABSTRACT

To provide an angle detection apparatus which can reduce the error of the angle which is caused by the eccentricity, by performing the reduction processing about smallest possible number of frequency bands and the lowest possible order of frequency band. An angle detection apparatus performs a first-order component reduction processing which reduces a first-order component which is a component of one rotation period in a mechanical angle of the rotor, to each of the first system two output signals; and calculates a first angle of the rotor, based on the first system two output signals to which the first-order component reduction processing was performed.

13 Claims, 23 Drawing Sheets

(58) Field of Classification Search
CPC . G01D 7/00; G01D 9/00; G01D 11/00; G01D 13/00; G01D 15/00; G01D 18/00; G01D 21/00; G01D 2204/00; G01D 2205/00; G01D 2207/00; G01D 2213/00; G01D 2218/00
See application file for complete search history.

(56) References Cited

U.S. PATENT DOCUMENTS

| | | |
|---|---|---|
| 2014/0316733 A1 | 10/2014 | Mori et al. |
| 2018/0351437 A1* | 12/2018 | Ikeda ................ G01D 5/2046 |
| 2020/0363233 A1 | 11/2020 | Ikeda et al. |
| 2022/0024517 A1 | 1/2022 | Mori et al. |
| 2022/0363310 A1 | 11/2022 | Ikeda et al. |

FOREIGN PATENT DOCUMENTS

| | | | |
|---|---|---|---|
| EP | 4063799 A1 | | 9/2022 |
| JP | 2000-018968 A | | 1/2000 |
| JP | 2012-145371 A | | 8/2012 |
| JP | 2015040806 A | * | 3/2015 |
| JP | 5762622 B2 | | 8/2015 |
| WO | 2019/123592 A1 | | 6/2019 |

OTHER PUBLICATIONS

Extended European Search Report dated Jan. 2, 2023 in Application No. 20917822.7.
International Search Report of PCT/JP2020/004520 dated Mar. 17, 2020 [PCT/ISA/210].
Communication issued Jan. 6, 2025 in Chinese Application No. 202080093309.3.
Communication dated Aug. 27, 2024 issued by the State Intellectual Property Office of the P.R.China in application No. 202080093309.3.

* cited by examiner

FIG. 9    WHEN ECCENTRICITY DOES NOT OCCUR

FIG. 10   WHEN ECCENTRICITY OCCURS

FIG. 17   WHEN ECCENTRICITY OCCURS

FIG. 19 WHEN ECCENTRICITY OCCURS

| θM2 | 0 | ΔθM | 2ΔθM | · · · · | 2π−2ΔθM | 2π−ΔθM |
|---|---|---|---|---|---|---|
| V1B_1STMM | ○○ | ○○ | ○○ | · · · · | ○○ | ○○ |
| V2B_1STMM | ○○ | ○○ | ○○ | · · · · | ○○ | ○○ |

| θM1 | 0 | ΔθM | 2ΔθM | · · · · | 2π−2ΔθM | 2π−ΔθM |
|---|---|---|---|---|---|---|
| V1A_1STMM | ○○ | ○○ | ○○ | · · · · | ○○ | ○○ |
| V2A_1STMM | ○○ | ○○ | ○○ | · · · · | ○○ | ○○ |

| θM1 | T1A | T2A | T3A | T4A | T5A |
|---|---|---|---|---|---|
| V1A_1STMM | ○○ | ○○ | ○○ | ○○ | ○○ |
| V2A_1STMM | ○○ | ○○ | ○○ | ○○ | ○○ |

ANGLE DETECTION APPARATUS

CROSS REFERENCE TO RELATED APPLICATIONS

This application is a National Stage of International Application No. PCT/JP2020/004520, filed Feb. 6, 2020.

TECHNICAL FIELD

The present disclosure relates to an angle detection apparatus.

BACKGROUND ART

As the angle detection device which detects the rotational angle of the motor, the resolver is used well. Although the resolver is known as the robust angle detection device, the resolver is also required for redundancy from the request of the fault tolerance of the motor drive system.

Then, the patent document 1 discloses the dual system resolver which is provided with the first system excitation winding and output winding, and the second system excitation winding and output winding. In the patent document 2, as described in the paragraph 0043, 0044, and the FIG. 10, a plurality of tooth of the stator are divided into four in the circumferential direction; each tooth group divided into four is set to "the first block B1 of the first system", "the first block B2 of the second system", "the second block B3 of the first system", and "the second block B4 of the second system"; and two tooth groups of the same system are disposed so as to oppose to each other. According to this, unbalanced of magnetic flux if the eccentricity of the stator occurs is decreased, and the angle detection accuracy can be improved.

CITATION LIST

Patent Literature

Patent document 1: JP 2000-18968 A
Patent document 2: WO 2019/123592 A

SUMMARY OF INVENTION

Technical Problem

However, in the technology of the patent document 2, by dividing into 4 and contriving geometric arrangement, the angle error due to the eccentricity is reduced. Accordingly, it is inapplicable to a resolver whose geometric arrangement of windings of two systems is different from the patent document 2.

Although the inventor studied a method to reduce the detection error of the angle due to the eccentricity, since a plurality of high order error components due to the eccentricity are superimposed on an the angle detection value, it is necessary to perform processing which reduces error components of a plurality of high order frequency bands, and it is not easy to realize an accurate reduction processing due to restriction of increase in the calculation processing load and restriction of increase in the sampling frequency.

Then, the purpose of the present disclosure is to provide an angle detection apparatus which can reduce the error of the angle which is caused by the eccentricity, by performing the reduction processing about smallest possible number of frequency bands and the lowest possible order of frequency band, without depending on geometric arrangement of the windings to a plurality of tooth.

Solution to Problem

An angle detection apparatus according to the present disclosure including:
a resolver that is provided with a stator which is provided with a first system excitation winding and first system two output windings, and a rotor which is provided with a salient pole;
a first system excitation unit that applies AC voltage of a first period to the first system excitation winding;
a first system output signal detection unit that detects periodically first system two output signals which are output signals of the first system two output windings at a preliminarily set detection timing;
a first system first-order component reduction processing unit that performs a first-order component reduction processing which reduces a first-order component which is a component of one rotation period in a mechanical angle of the rotor, to each of the first system two output signals; and
a first system angle calculation unit that calculates a first angle of the rotor, based on the first system two output signals to which the first-order component reduction processing was performed.

Advantage of Invention

According to the angle detection apparatus of the present disclosure, by reducing the error component of the first-order mechanical angle that is caused by the eccentricity, from the first system two output signals, a plurality of high order error components that are caused by the eccentricity can be reduced from the first angle calculated based on the first system two output signals. Since the reduction processing which reduces the first-order component of low order about the one frequency band is performed, the angle error due to the eccentricity can be reduced, while suppressing the increase in the calculation processing load and suppressing the increase in the sampling frequency.

DETAILED DESCRIPTION OF THE EMBODIMENTS

1. Embodiment 1

Figure 1:
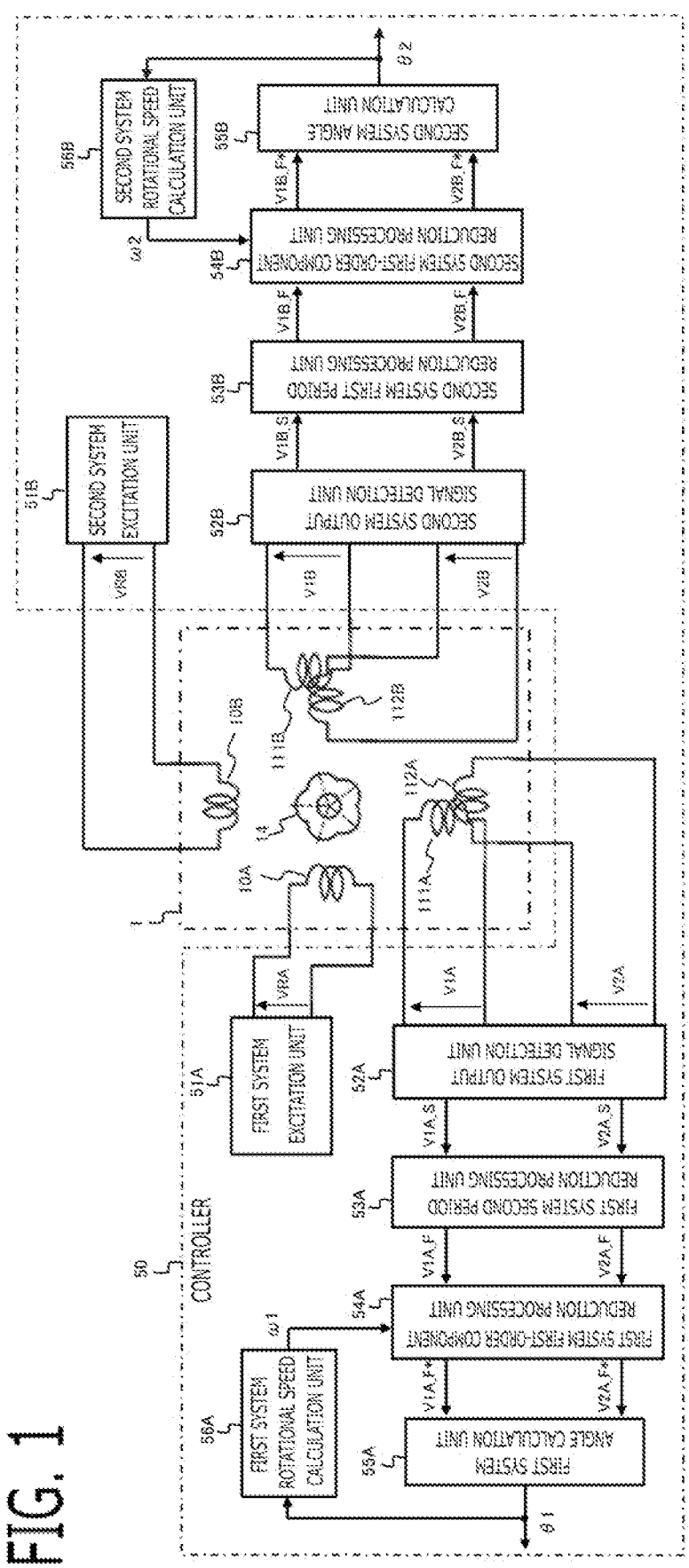
FIG. 1 is a schematic configuration diagram of the angle detection apparatus according to Embodiment 1.

An angle detection apparatus according to Embodiment 1 will be explained with reference to drawings. FIG. 1 is a schematic configuration diagram of the angle detection apparatus according to the present embodiment.

1-1. Resolver 1

The angle detection apparatus is provided with a resolver 1. The resolver 1 is provided with a stator 13 and a rotor 14. The stator 13 is provided with a first system excitation winding 10A, first system two output windings 111A, 112A (hereinafter, referred to also as a first output winding 111A and a second output winding 112A), a second system excitation winding 10B and second system two output windings 111B, 112B (hereinafter, referred to also as a first output winding 111B and a second output winding 112B).

A magnetic interference occurs between the first system windings and the second system windings. That is to say, by the magnetic flux generated by the first system excitation winding 10A, an induced voltage is generated not only in the first system two output windings 111A, 112A, but also in the second system two output windings 111B, 112B. By the magnetic flux generated by the second system excitation winding 10B, an induced voltage is generated not only in the second system two output windings 111B, 112B, but also in the first system two output windings 111A, 112A.

Figure 2:
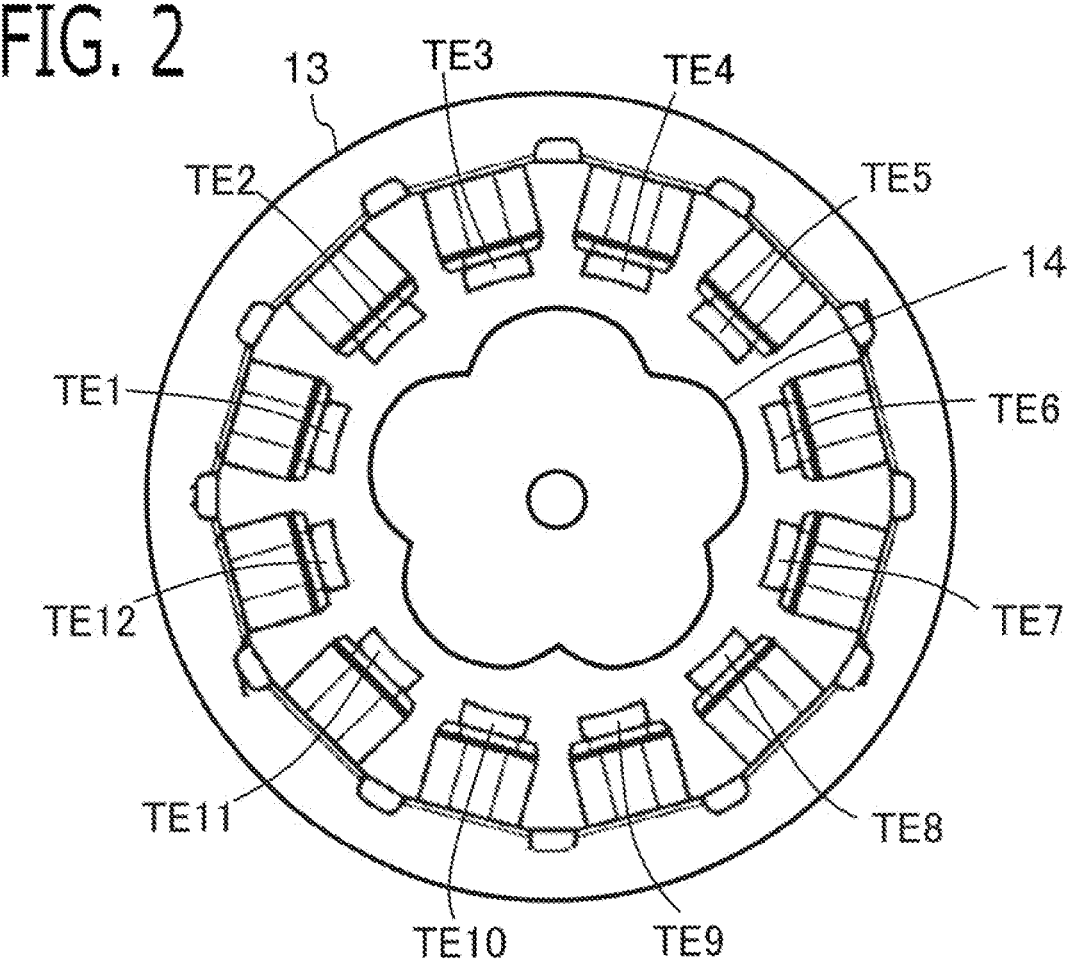
FIG. 2 is a side view of the resolver viewed in the axial direction according to Embodiment 1.

As shown in FIG. 2, the first system excitation winding 10A, the first system two output windings 111A, 112A, the second system excitation winding 10B, and second system two output windings 111B, 112B are wound around the same one stator 13. The rotor 14 is arranged in the radial-direction inner side of the stator 13.

The rotor 14 has a salient pole. In the present embodiment, the rotor 14 has N salient poles (N is a natural number greater than or equal to two). In this example, N is set to 5, and a shaft angle multiplier N is set to 5. Therefore, whenever the rotor 14 rotates once in the mechanical angle, it rotates 5 times in the electrical angle. The rotor 14 is provided with N projection parts which are arranged equally in the circumferential direction on the peripheral part of the rotor. The salient pole is caused by the projection part. The projection height to the radial-direction outside of the projection parts is formed so that a gap permeance between the stator 13 and the rotor 14 changes in sine wave shape according to rotation. That is to say, the resolver 1 is a variable reluctance (VR) type resolver.

Figure 6:
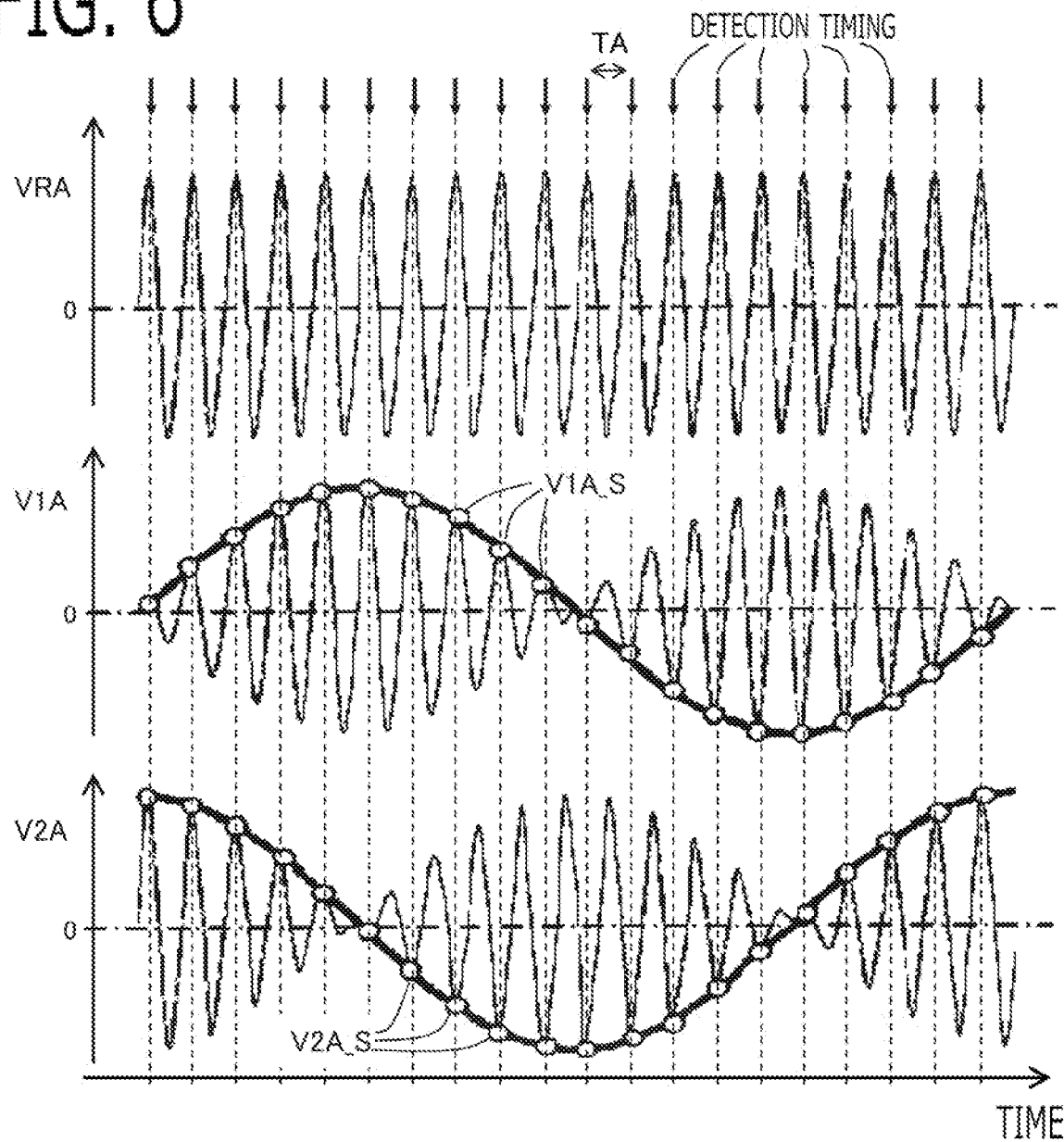
FIG. 6 is a time chart for explaining the first system detection timing when supposing that there is no magnetic interference between systems according to Embodiment 1.

As showing an example supposed that there is no magnetic interference between two systems in FIG. 6, when the rotor rotates in the state where the AC voltage VRA is applied to the first system excitation winding 10A, the amplitude of AC voltage V1A induced by the first system first output winding 111A and the amplitude of AC voltage V2A induced by the first system second output winding 112A change in a sine wave shape (or in a cosine wave shape), according to the rotational angle (the gap permeance) in the electrical angle of the rotor. The first system first output winding 111A and the first system second output winding 112A are wound around the positions of the circumferential direction of the stator 13 so that the amplitudes of those AC voltages are mutually different 90 degrees in the electrical angle. Similarly, the second system first output winding 111B and the second system second output winding 112B are wound around the positions of the circumferential direction of the stator 13 so that the amplitudes of those induced AC voltages are mutually different 90 degrees in the electrical angle.

In the present embodiment, as shown in FIG. 2, the stator 13 is provided with 12 teeth arranged equally in the circumferential direction; the first system windings are wound around the first teeth TE1 to the sixth teeth TE6; and the second system windings are wound around the seventh teeth TE7 to the twelfth teeth TE12. The first system excitation winding 10A is distributed and wound around the first teeth TE1 to the sixth teeth TE6. The first system first output winding 111A and the first system second output winding 112A are distributed and wound around the first teeth TE1 to the sixth teeth TE6 so that the amplitudes of those induced AC voltages are mutually different 90 degrees in the electrical angle. Similarly, the second system excitation winding 10B is distributed and wound around the seventh teeth TE7 to the twelfth teeth TE12. The second system first output winding 111B and the second system second output winding 112B are distributed and wound around the seventh teeth TE7 to the twelfth teeth TE12 so that the amplitudes of those induced AC voltages are mutually different 90 degrees in the electrical angle.

The first system excitation winding 10A wound around the plurality of teeth is connected in series between tooth; and the two terminals of the first system excitation winding 10A connected in series are connected to the controller 50 (the first system excitation unit 51A) described below. Similarly, the two terminals of the first system first output winding 111A connected in series between tooth are connected to the controller 50 (the first system output signal detection unit 52A) described below. The two terminals of the first system second output winding 112A connected in series between tooth are connected to the controller 50 (the first system output signal detection unit 52A) described below. The two terminals of the second system excitation winding 10B connected in series are connected to the controller 50 (the second system excitation unit 51B) described below. Similarly, the two terminals of the second system first output winding 111B connected in series between tooth are connected to the controller 50 (the second system output signal detection unit 52B) described below. The two terminals of the second system second output winding 112B connected in series between tooth are connected to the controller 50 (the second system output signal detection unit 52B) described below.

The number of projection parts (shaft angle multiplier) and the number of teeth may be set to any numbers. The first system windings and the second system windings may not be arranged being divided into two in the circumferential direction, but may be arranged being distributed in the circumferential direction.

1-2. Controller 50

The angle detection apparatus is provided with a controller 50. As shown in FIG. 1, the controller 50 is provided with a first system excitation unit 51A, a first system output signal detection unit 52A, a first system second period reduction processing unit 53A, a first system first-order component reduction processing unit 54A, a first system angle calculation unit 55A, a first system rotational speed calculation unit 56A, a second system excitation unit 51B, a second system output signal detection unit 52B, a second system first period reduction processing unit 53B, a second system first-order component reduction processing unit 54B, a second system angle calculation unit 55B, and a second system rotational speed calculation unit 56B.

Figure 3:
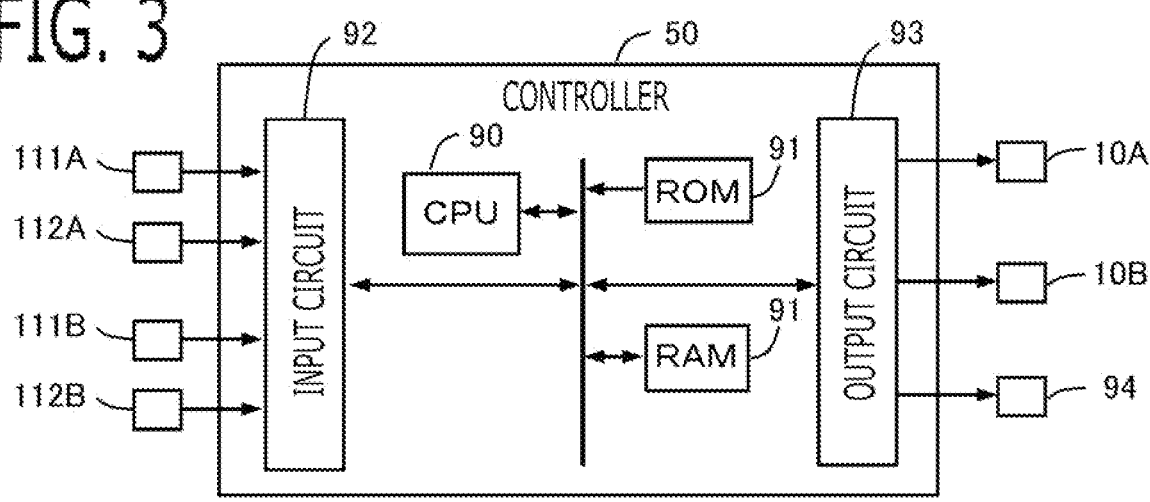
FIG. 3 is a hardware configuration diagram of the controller according to Embodiment 1.

Each function of the controller 50 is realized by processing circuits provided in the controller 50. Specifically, as shown in FIG. 3, the controller 50 is provided with, as a processing circuit, an arithmetic processor (computer) 90 such as a CPU (Central Processing Unit), storage apparatuses 91 that exchange data with the arithmetic processor 90, an input circuit 92 that inputs external signals to the arithmetic processor 90, an output circuit 93 that outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, there are provided a RAM (Random Access Memory) which can read data and write data from the arithmetic processor 90, a ROM (Read Only Memory) which can read data from the arithmetic processor 90, and the like. The first system first output winding 111A, the first system second output winding 112A, the second system first output winding 111B, and the second system second output winding 112B are connected to the input circuit 92. The input circuit 92 is provided with an A/D converter and the like for inputting the output voltages of these windings into the arithmetic processor 90. The output circuit 93 is connected with the first system excitation winding 10A and the second system excitation winding 10B, and is provided with driving circuits, such as switching devices for applying the AC voltage VRA to these windings. A lowpass filter circuit may be provided in the output side of the switching device. The output circuit 93 is provided with signal output circuits, such as a communication circuit which transmits the first angle θ1 and the second angle θ2 which were calculated to the external controller 94.

Then, the arithmetic processor 90 runs software items (programs) stored in the storage apparatus 91 such as a ROM and collaborates with other hardware devices in the controller 50, such as the storage apparatus 91, the input circuit 92, and the output circuit 93, so that the respective functions of the control units 51A to 56B included in the controller 50 are realized. Setting data utilized in the control units 51A to 56B are stored, as part of software items (programs), in the storage apparatus 91 such as a ROM. Each function of the controller 50 will be described in detail below.

1-2-1. First System and Second System Excitation Units

The first system excitation unit 51A applies AC voltage VRA (in this example, AC voltage VRA of a sine wave) of first period TA to the first system excitation winding 10A. The first system excitation unit 51A calculates an AC voltage command of the first period TA, and generates the PWM signal (Pulse Width Modulation) which turns on and off the switching device for the first system excitation winding provided in the output circuit 93, based on the comparison result between the AC voltage command and the triangular wave. When the switching device is turned on, the power source voltage is applied to the first system excitation winding 10A side, and when the switching device is turned off, the application of the power source voltage stops.

The second system excitation unit 51B applies AC voltage VRB (in this example, AC voltage VRB of a sine wave) of second period TB to the second system excitation winding 10B. As described later, the second period TB is set to a period different from the first period TA. In the present embodiment, the second period TB is set to two times of the first period TA (TB=2×TA). For example, in the case of TA=50 microseconds, it is set as TB=100 microseconds.

The second system excitation unit 51B calculates an AC voltage command of the second period TB, and generates the PWM signal (Pulse Width Modulation) which turns on and off the switching device for the second system excitation winding provided in the output circuit 93, based on the comparison result between the AC voltage command and the triangular wave.

1-2-2-1. First System Output Signal Detection Unit

The first system output signal detection unit 52A detects periodically first system two output signals V1A, V2A which are output signals of the first system two output windings 111A, 112A at a preliminarily set detection timing (hereinafter, referred to also as first system detection timing). The output signal of the first system first output winding 111A is referred to as a first system first output signal V1A, and the output signal of the first system second output winding 112A is referred to as a first system second output signal V2A.

In the present embodiment, the first system output signal detection unit 52A detects the first system two output signals V1A, V2A at a timing when the AC voltage VRA of the first period TA applied to the first system excitation winding 10A becomes the maximum value or the minimum value (in this example, the maximum value). The first system output signal detection unit 52A detects the first system two output signals V1A, V2A at every the first period TA when the AC voltage VRA becomes the maximum value. That is to say, the first system detection timing is set to the timing at every the first period TA.

FIG. 6 shows an example in which unlike the present embodiment, there is no magnetic interference between systems, and the component of the second period is not superimposed on the first system two output signals V1A, V2A. At every the first period TA when the AC voltage VRA of the first period TA becomes the maximum value, the first system two output signals V1A, V2A are detected.

1-2-2-2. First System Second Period Reduction Processing Unit

Figure 4:
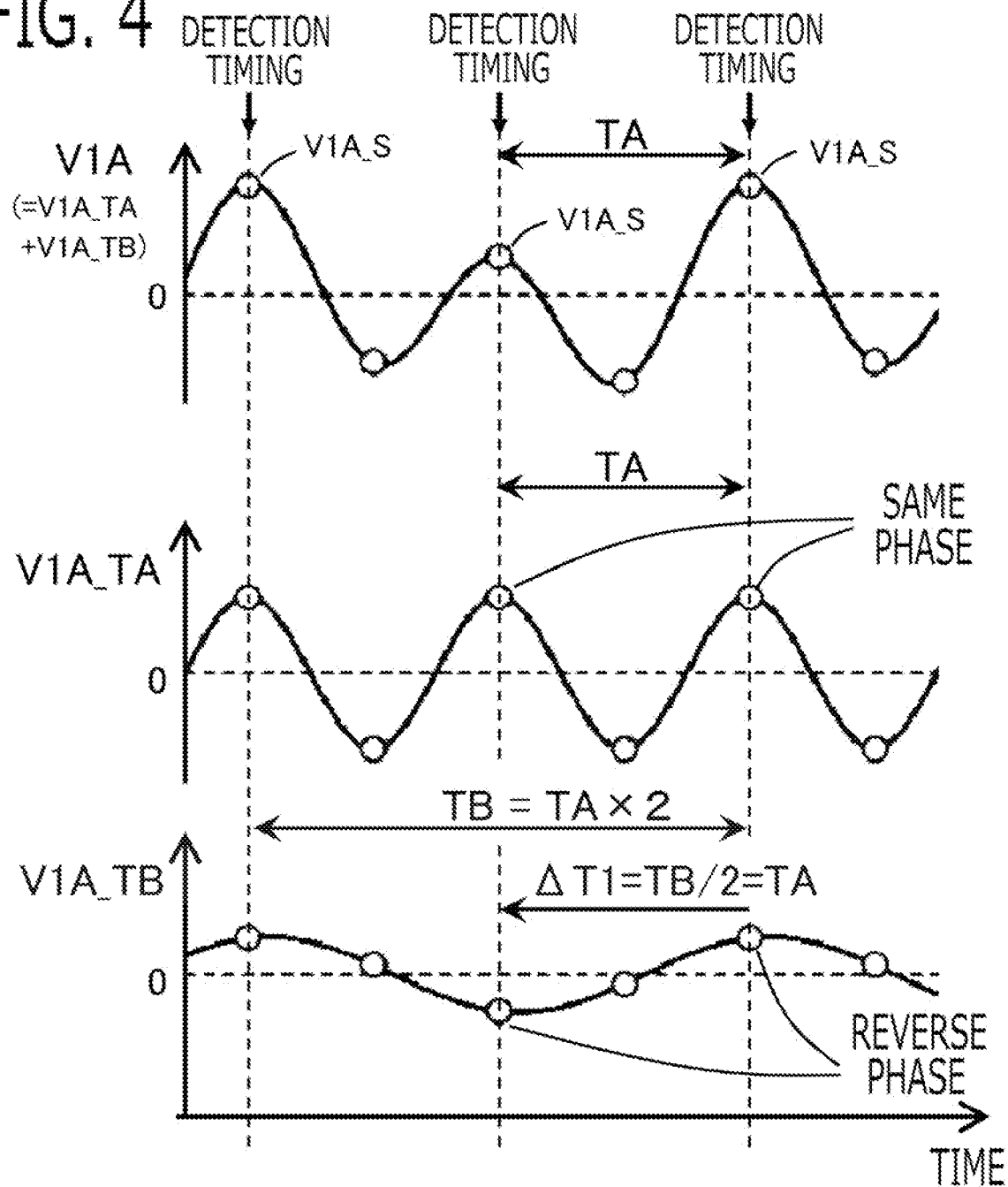
FIG. 4 is a time chart for explaining the first system second period reduction processing according to Embodiment 1.

As showing an example of the first system first output signal V1A in FIG. 4, the components of the second period V1A_TB, V2A_TB induced by the magnetic flux of the second period TB excited in the second system excitation winding 10B are superimposed on the first system two output signals V1A, V2A, respectively, due to the magnetic interference between systems. The first system first output signal V1A is shown in the upper row graph of FIG. 4; the component of the first period V1A_TA induced by the magnetic flux of the first system excitation winding 10A included in the first system first output signal V1A is shown in the middle graph; and the component of the second period V1A_TB induced by the magnetic flux of the second system excitation winding 10B included in the first system first output signal V1A is shown in the lower row graph. The first system first output signal V1A becomes a signal obtained by totaling the component of the first period V1A_TA and the component of the second period V1A_TB, and if the angle is calculated with these signals, the detection error will occur. Therefore, in order to suppress the detection error of the angle, it is necessary to reduce the component of the second period V1A_TB from the first system first output signal V1A.

Then, the first system second period reduction processing unit 53A performs a second period reduction processing which reduces the component of the second period TB, to the detection values of the first system two output signals V1A_S, V2A_S.

In the present embodiment, the second period reduction processing is performed based on a principle explained in the following. As shown in the lower row graph of FIG. 4, in the component of the second period V1A_TB of the first system first output signal, the phase is reversed and the sign of plus or minus is reversed at a period (for example, half period TB/2 of the second period) obtained by adding an integral multiple of the second period TB to a half period TB/2 of the second period.

Then, as the second period component removal processing, the first system second period reduction processing unit 53A adds the detection values of the output signals of the first system two output windings V1A_S, V2A_S detected at this time detection timing, and the detection values of the output signals of the first system two output windings V1A_Sold, V2A_Sold detected at a detection timing earlier by the first system reduction processing interval ΔT1 than this time detection timing. The first system reduction processing interval ΔT1 is set as shown in the next equation. Herein, M is an integer greater than or equal to 0. In the present embodiment, M is set to 0, and the first system reduction processing interval ΔT1 is set to the half period TB/2 of the second period.

$$\Delta T1 = TB/2 + TB \times M \quad (1)$$

Figure 5:
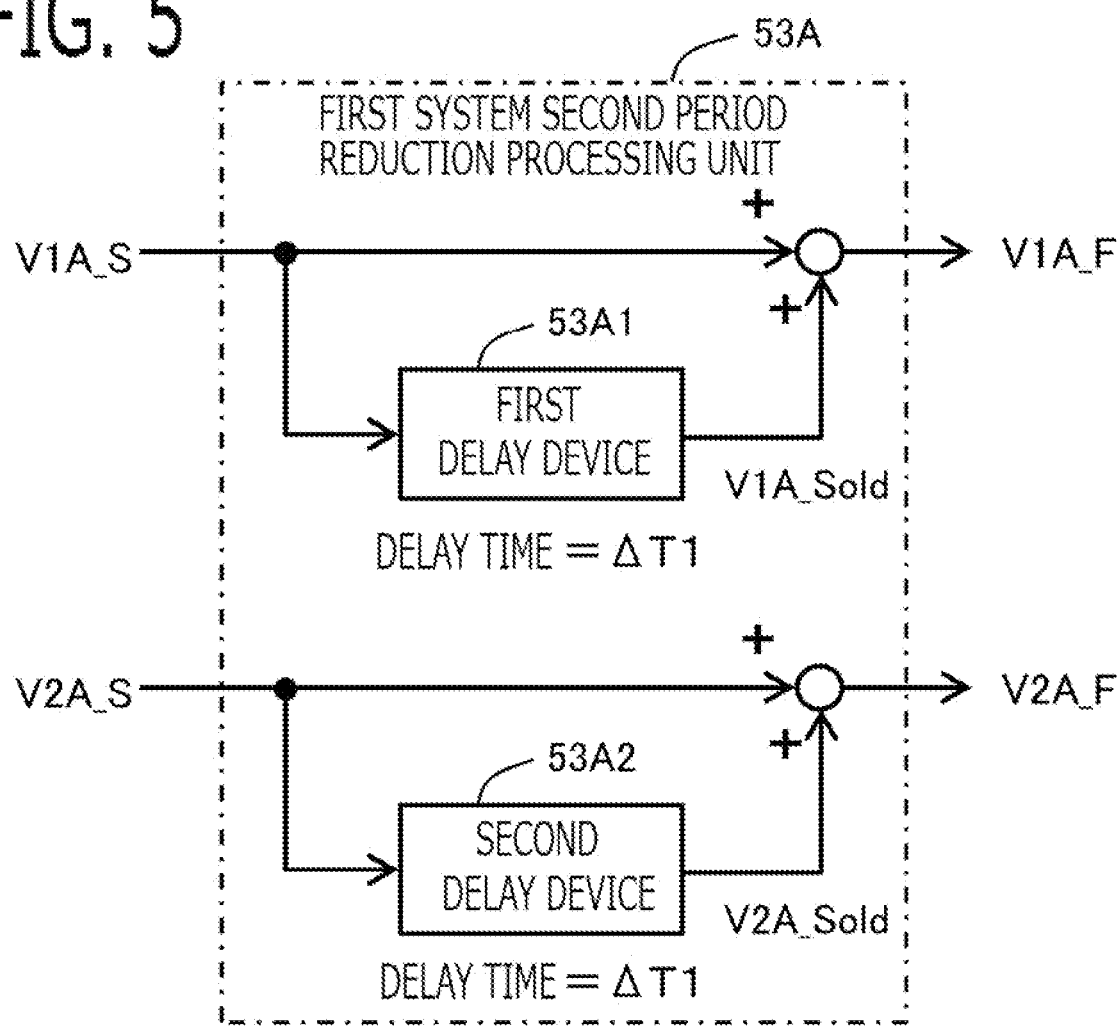
FIG. 5 is a block diagram of the first system second period reduction processing unit according to Embodiment 1.

The first system second period reduction processing unit 53A is configured, for example, as shown in FIG. 5. The first system second period reduction processing unit 53A is provided with a first delay device 53A1 which delays the detection value of the first system first output signal V1A_S by the first system reduction processing interval ΔT1, and outputs; adds the detection value of the first system first output signal V1A_S, and the output V1A_Sold of the first delay device 53A1; and calculates detection value of the first system first output signal V1A_F after the second period reduction processing. Similarly, the first system second period reduction processing unit 53A is provided with a second delay device 53A2 which delays the detection value of the first system second output signal V2A_S by the first system reduction processing interval ΔT1, and outputs; adds the detection value of the first system second output signal V2A_S, and the output V2A_Sold of the second delay device 53A2; and calculates detection value of the first system second output signal V2A_F after the second period reduction processing.

According to this configuration, the two components of the second period whose the signs of plus or minus are reversed with each other are added, and the two components of the second period are canceled with each other. Accordingly, in the detection values of the output signals of the first system two output windings V1A_F, V2A_F after addition, the component of the second period due to the AC voltage VRB of the second period TB is reduced, and the influence of the magnetic interference can be reduced.

1-2-2-3. First System First-Order Component Reduction Processing Unit

<Superimposing of First-Order Component Due to Eccentricity of Rotor>

A problem when the rotor 14 decenters to the stator 13 will be explained. The eccentricity is that the center of the stator 13 and the center of the rotor 14 deviate. In the present embodiment, as mentioned above, the first system and the second system excitation windings, and the output winding are distributed and wound around each teeth (circumferential direction). In this example, the first system excitation winding and the output winding are distributed and wound around the first teeth TE1 to the sixth teeth TE6, and the second system excitation winding and the output winding are distributed and wound around the seventh teeth TE7 to the twelfth teeth TE12. If the eccentricity occurs, a gap width between each teeth and the rotor 14 differs according to each teeth. For example, if the center of the rotor 14 decenters so as to approach the first teeth TE1, the gap width between the first teeth TE1 and the rotor 14 narrows, and the gap width between the seventh teeth TE7 opposing to the first teeth TE1 and the rotor 14 expands.

Accordingly, the excitation force of the rotor 14 by the excitation winding wound around each teeth varies according to the position of the circumferential direction, and the induced voltage outputted from the output winding wound around each teeth varies according to the position of the circumferential direction. Therefore, if the eccentricity occurs, the variation component of the one rotation period in the mechanical angle of the rotor 14 is superimposed on the first system first output signal V1A and the second output signal V2A, and the variation component of the one rotation period in the mechanical angle of the rotor 14 is superimposed on the second system first output signal V1B and the second output signal V2B.

Figure 7:
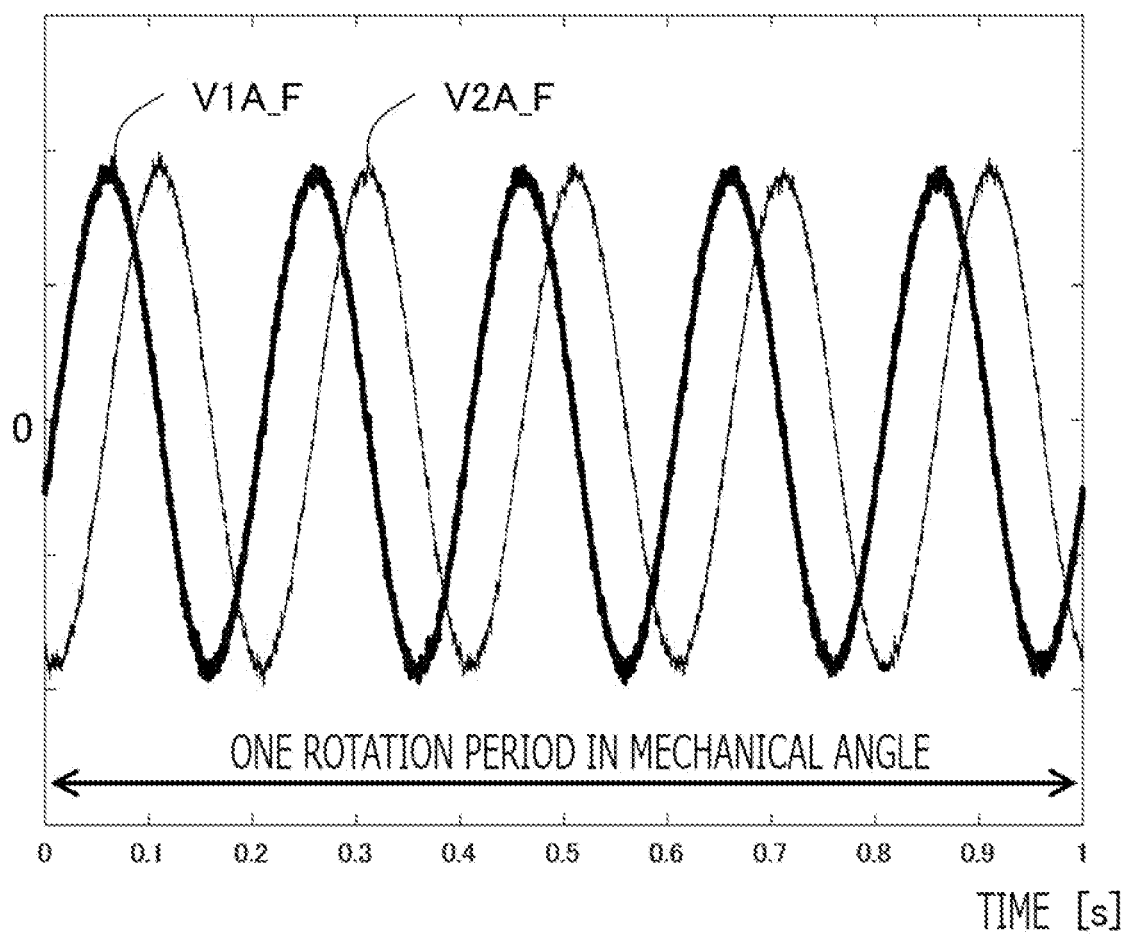
FIG. 7 is a time chart of the first system two output signals when the eccentricity does not occur according to Embodiment 1.
Figure 8:
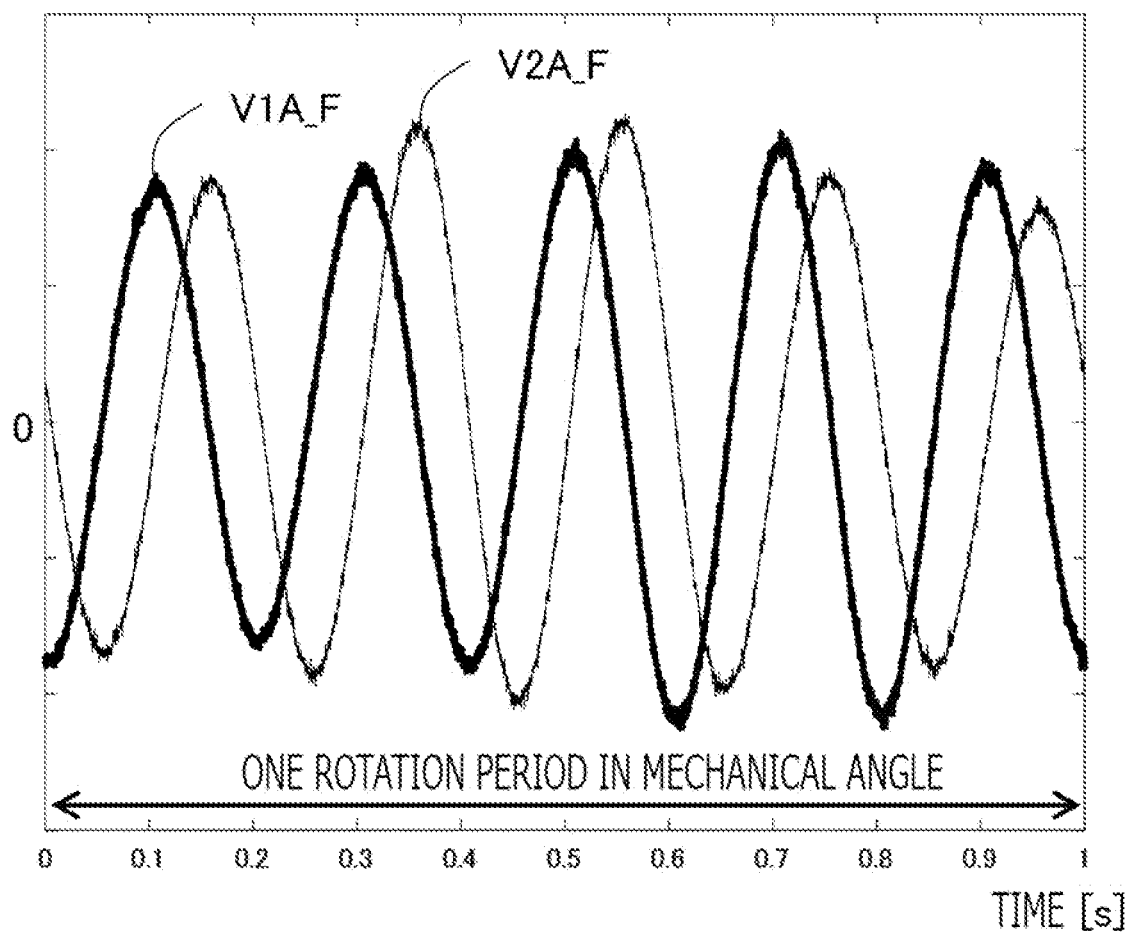
FIG. 8 is a time chart of the first system two output signals when the eccentricity occurs according to Embodiment 1.

FIG. 7 shows a time waveform of the detection values of the first system two output signals V1A_F, V2A_F after the second period reduction processing if the eccentricity does not occur, and FIG. 8 shows a time waveform of the detection values of the first system two output signals V1A_F, V2A_F after the second period reduction processing if the eccentricity occurs. The rotor 14 is rotating one time in 1 second.

Since the number of salient poles N of the rotor 14 are 5, in FIG. 7 and FIG. 8, in the one rotation period in the mechanical angle of the rotor 14, the detection values of the first system two output signals V1A_F, V2A_F change 5 times in sine wave shapes, and the one rotation period in the electrical angle of the rotor 14 occurs 5 times.

If the eccentricity occurs, variation of the one rotation period in the mechanical angle occurs in the detection values of the first system two output signals V1A_F, V2A_F. For example, an amplitude of the detection value of the first output signal V1A_F and an amplitude of the detection value of the second output signal V2A_F vary at the one rotation period in the mechanical angle. Although it is difficult to see in FIG. 8, a vibration center of the detection value of the first output signal V1A_F and a vibration center of the detection value of the second output signal V2A_F vary at the one rotation period in the mechanical angle. That is to say, the detection value of the first output signal V1A_F and the detection value of the second output signal V2A_F vary in an offset manner at the one rotation period in the mechanical angle. Therefore, a first angle θ1 calculated based on a divided value (V1A_F/V2A_F) obtained by dividing the detection value of the first output signal V1A_F by the detection value of the second output signal V2A_F varies due to the eccentricity, and an error occurs.

Figure 9:
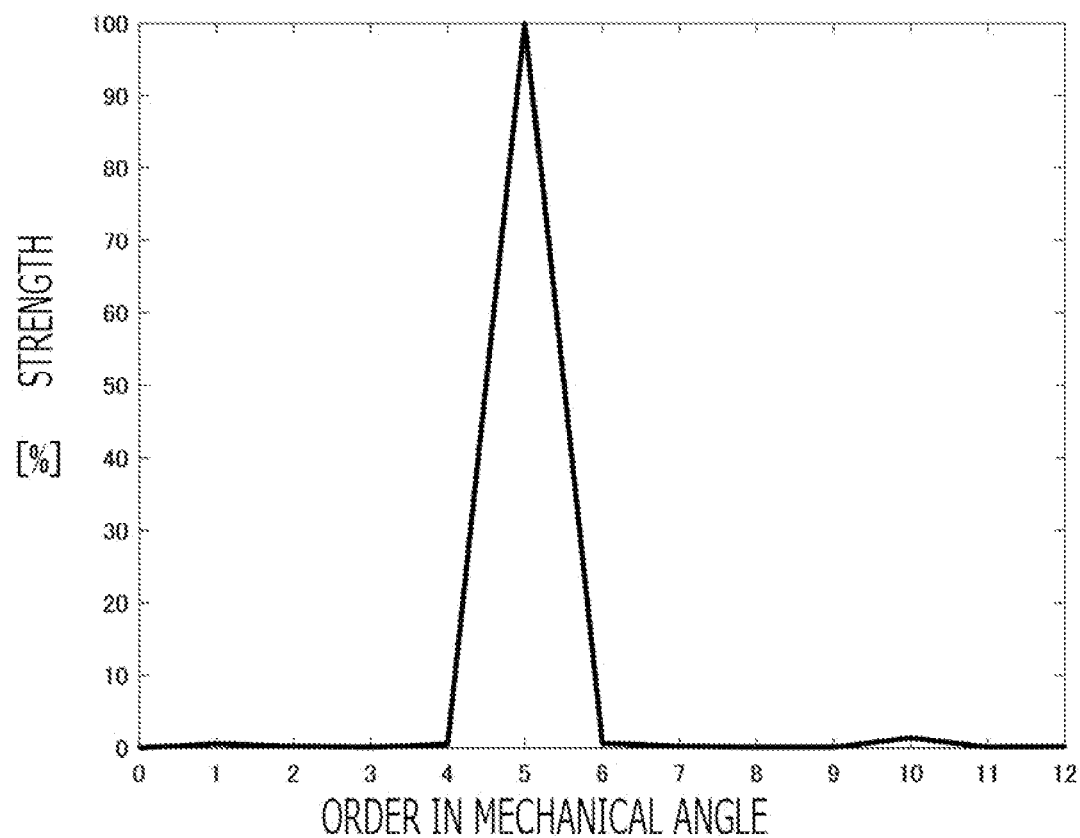
FIG. 9 is a figure showing frequency analysis result of the first system two output signals when the eccentricity does not occur according to Embodiment 1.
Figure 10:
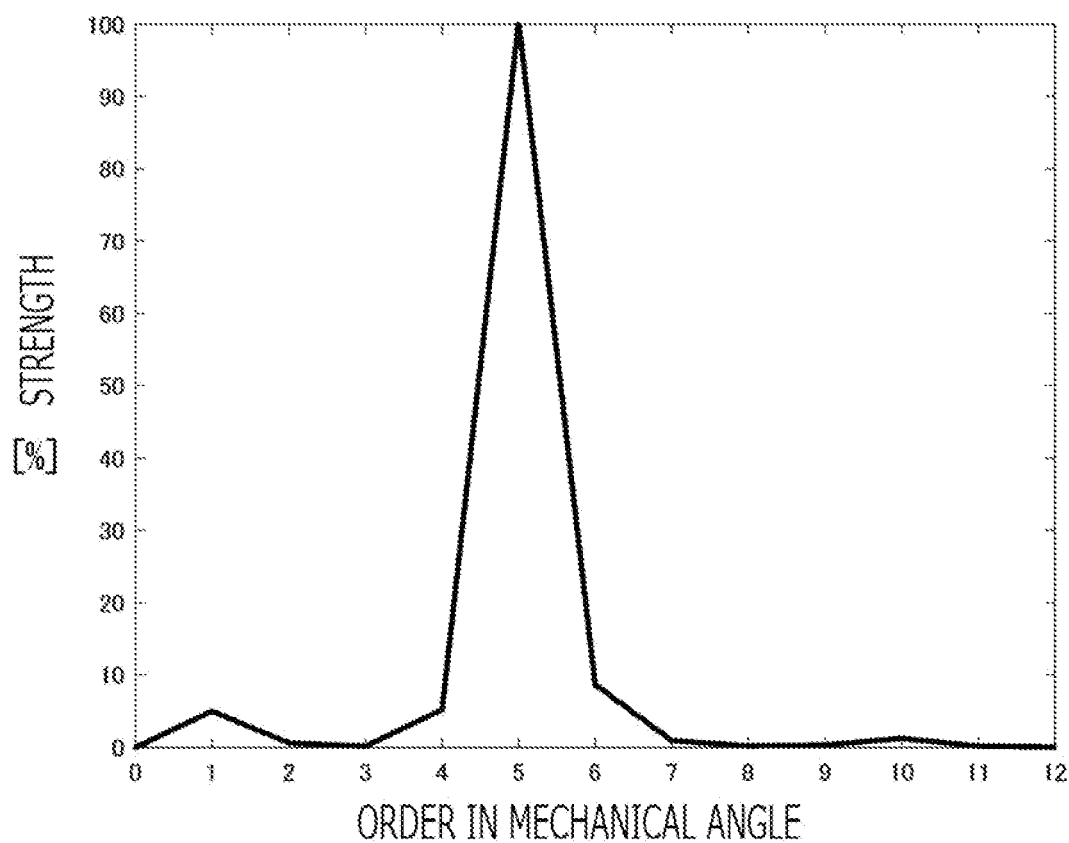
FIG. 10 is a figure showing frequency analysis result of the first system two output signals when the eccentricity occurs according to Embodiment 1.

FIG. 9 shows a result obtained by performing a frequency analysis (FFT) to the detection value of the first output signal V1A_F shown in FIG. 7 when the eccentricity does not occur, and FIG. 10 shows a result obtained by performing a frequency analysis (FFT) to the detection value of the first output signal V1A_F shown in FIG. 8 when the eccentricity occurs. The vertical axis is expressed by percentage which set a fundamental wave component of the detection value of the first output signal V1A_F (a fifth-order frequency component in the mechanical angle (5 times of the one rotational frequency in the mechanical angle)) to 100%. The horizontal axis is expressed by order (multiple) of the one rotational frequency in the mechanical angle.

Compared with the case where the eccentricity does not occur, in the case where the eccentricity occurs, the first-order frequency component in the mechanical angle (the component of the one rotational frequency in the mechanical angle) increases. Herein, according to nonpatent literature (Mori, Kojima, Kimpara, Nakano "High Precision On-line Offset Correction for Motor Angle Sensors", Institute of Electrical Engineers of Japan Transactions on Industry Applications Vol. 136 No. 8 (2016)), if the Kth-order error of an offset manner in the mechanical angle occurs in the detection value of the output signal of the output winding, the (K−1)-order error and the (K+1)-order error occur in the angle error. For this reason, if the shaft angle multiplier is N, a (N−K)-order error and a (N+K)-order error occur in the angle error. In this example, the shaft angle multiplier N is 5, and the first-order error (K=1) in the mechanical angle occurs in the detection value of the output signal of the output winding. Accordingly, due to the offset variation of the one rotation period in the mechanical angle in the detection values of the first system two output signals, the fourth-order and the sixth-order error components in the mechanical angle occurs in the first angle θ1. And, due to the variation of the one rotation period in the mechanical angle in the amplitude of the detection values of the first system two output signals, the tenth-order error component in the mechanical angle which is two times of the shaft angle multiplier N=5 occurs in the first angle θ1. Therefore, if the resolver 1 is used as the rotational angle sensor of the motor, the fourth-order, the sixth-order, and the tenth-order torque ripples in the mechanical angle occur, and these worsen the driving performance.

Although it is also possible to perform a reduction processing which reduces the fourth-order, the sixth-order, and the tenth-order error components of the first angle θ1, it is necessary to perform reduction processing about a plurality of high order frequency bands, and it is not easy to realize an accurate reduction processing due to restriction of increase in the calculation processing load and restriction of increase in the sampling frequency. Therefore, by performing the reduction processing about smallest possible number of frequency bands and the lowest possible order of frequency band, it is desired to reduce the error of the first angle θ1 which is caused by the eccentricity.

<First-Order Component Reduction Processing>

Then, the first system first-order component reduction processing unit 54A performs a first-order component reduction processing which reduces the first-order component which is a component of the one rotation period (or the one rotational frequency) in the mechanical angle of the rotor, to each of the first system two output signals.

According to this configuration, by reducing the error component of the first-order mechanical angle that is caused by the eccentricity, from the first system two output signals, the fourth-order, the sixth-order and the tenth-order error components that are caused by the eccentricity can be reduced from the first angle θ1 calculated based on the first system two output signals. Since the reduction processing which reduces the first-order component of low order about the one frequency band is performed, the accuracy of the reduction processing can be improved, while suppressing the increase in the calculation processing load and suppressing the increase in the sampling frequency.

In the present embodiment, the first system first-order component reduction processing unit 54A calculates a detection value of the first system first output signal V1A_F* after the first-order component reduction processing by performing the first-order component reduction processing to the detection value of the first system first output signal V1A_F after the second period reduction processing; and calculates a detection value of the first system second output signal V2A_F* after the first-order component reduction processing by performing the first-order component reduction processing to the detection value of the first system second output signal V2A_F after the second period reduction processing.

In the first-order component reduction processing, the first system first-order component reduction processing unit 54A calculates first system two first-order component extraction values V1A_1ST, V2A_1ST by performing the first-order component extraction processing which extracts the first-order component in the mechanical angle, to each of the detection values of the first system two output signals V1A_F, V2A_F; and calculates detection values of the first system two output signals V1A_F*, V2A_F* after the first-order component reduction processing by subtracting the first system two first-order component extraction values V1A_1ST, V2A_1ST from the detection values of the first system two output signals V1A_F, V2A_F, respectively.

Figure 11:
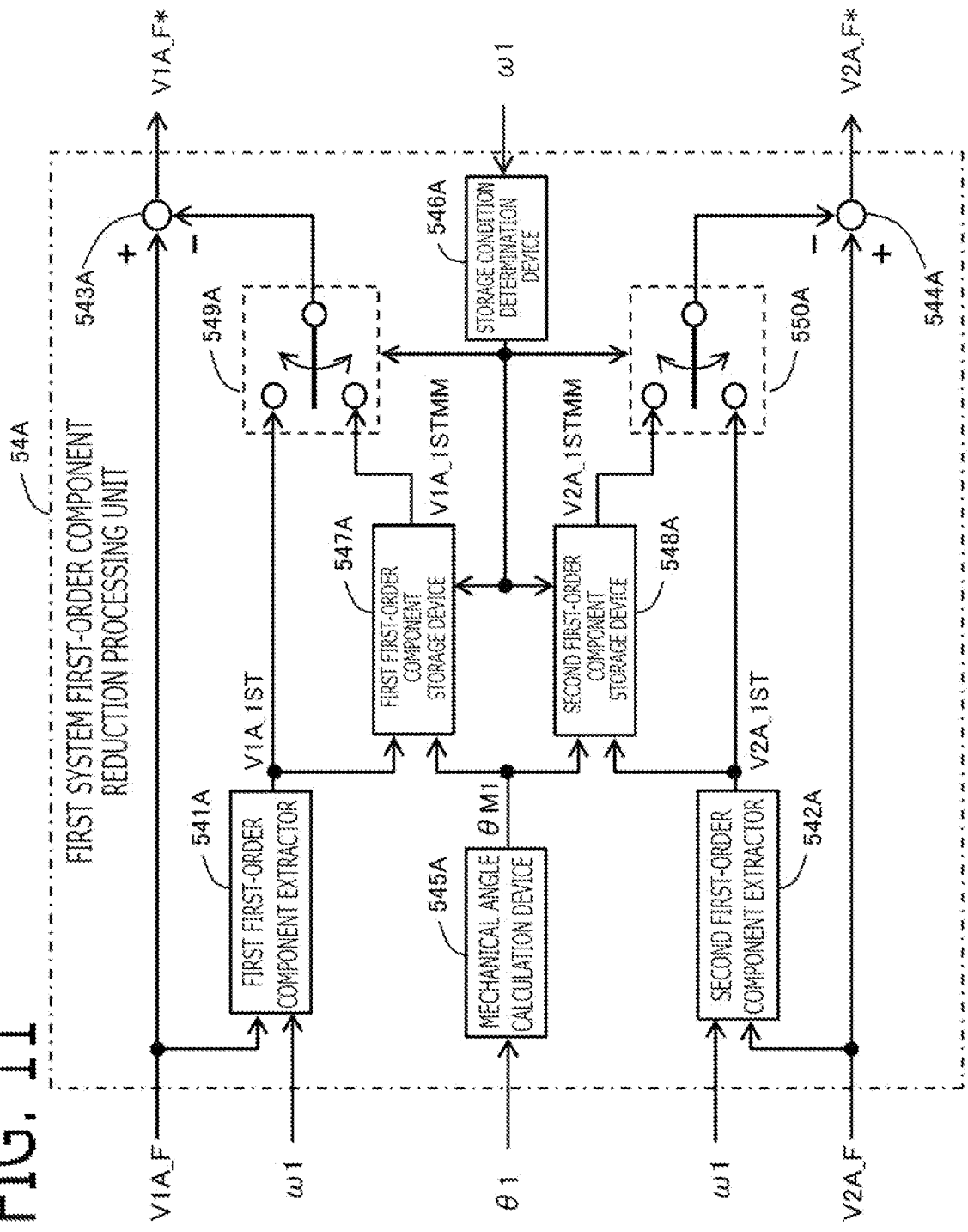
FIG. 11 is a block diagram of the first system first-order component reduction processing unit according to Embodiment 1.

The first system first-order component reduction processing unit 54A is configured, for example, as shown in FIG. 11. The first system first-order component reduction processing unit 54A is provided with a first first-order component extractor 541A, a second first-order component extractor 542A, a first subtractor 543A, a second subtractor 544A, and the like.

The first first-order component extractor 541A performs the first-order component extraction processing to the inputted detection value of the first system first output signal V1A_F, and outputs the first system first first-order component extraction value V1A_1ST. The first subtractor 543A subtracts the first system first first-order component extraction value V1A_1ST outputted via the first switching device 549A described below, from the detection value of the first system first output signal V1A_F, and outputs the detection value of the first system first output signal V1A_F* after the first-order component reduction processing. The second first-order component extractor 542A performs the first-order component extraction processing to the inputted detection value of the first system second output signal V2A_F, and outputs the first system second first-order component extraction value V2A_1ST. The second subtractor 544A subtracts the first system second first-order component extraction value V2A_1ST outputted via the second switching device 550A described below, from the detection value of the first system second output signal V2A_F, and outputs the detection value of the first system second output signal V2A_F* after the first-order component reduction processing.

For example, the first-order component extraction processing is a band pass filter processing which passes the first-order component (component of the one rotational frequency) in the mechanical angle. Various kinds of methods are used for the band pass filter processing.

The first and the second first-order component extractors 541A, 542A change the first-order frequency (the one rotational frequency) in the mechanical angle to which the first-order component reduction processing is performed, based on the first angular speed $\omega1$ calculated by the first system rotational speed calculation unit 56A described below. If the first angular speed $\omega1$ is an angular speed in the electrical angle, the first-order frequency in the mechanical angle becomes $\omega1/2\pi/N$.

Alternatively, in the first-order component reduction processing, the first system first-order component reduction processing unit 54A may perform a band stop filter processing which reduces the first-order component in the mechanical angle, to each of the detection values of the first system two output signals V1A_F, V2A_F, and directly calculate the detection values of the first system two output signals V1A_F*, V2A_F* after the first-order component reduction processing. In this case, the first-order frequency (the one rotational frequency) in the mechanical angle to which the band stop filter processing is performed is changed based on the first angular speed $\omega1$ calculated by the first system rotational speed calculation unit 56A.

<Storage and Read of First-Order Component Extraction Value>

In the present embodiment, the first system first-order component reduction processing unit 54A stores a plurality of the first system two first-order component extraction values V1A_1ST, V2A_1ST calculated at each phase (each angle $\theta M1$) of the one rotation period in the mechanical angle, by correlating with the corresponding phase (the angle $\theta M1$). Then, the first system first-order component reduction processing unit 54A refers to the plurality of the first system two first-order component extraction values V1A_1STMM, V2A_1STMM which were stored by correlating with the phase, and reads the first system two first-order component extraction values V1A_1STMM, V2A_1STMM corresponding to the present phase (the angle $\theta M1$) of the one rotation period in the mechanical angle; subtracts the read first system two first-order component extraction values V1A_1STMM, V2A_1STMM from the present detection values of the first system two output signals V1A_F, V2A_F, respectively; and calculates the detection values of the first system two output signals V1A_F*, V2A_F* after the first-order component reduction processing.

According to this configuration, the first-order component which is caused by the eccentricity can be extracted by the first-order component extraction processing, and the extracted first-order component is stored by correlating with the phase. Then, by referring to the stored data, the first-order component extraction value corresponding to the present phase can be calculated, and the first-order component reduction processing can be performed. Therefore, it is not necessary to always calculate the first-order component extraction value by performing the first-order component extraction processing, and to correct the first system output signal by the calculated first-order component extraction value.

Figures 12, 13:
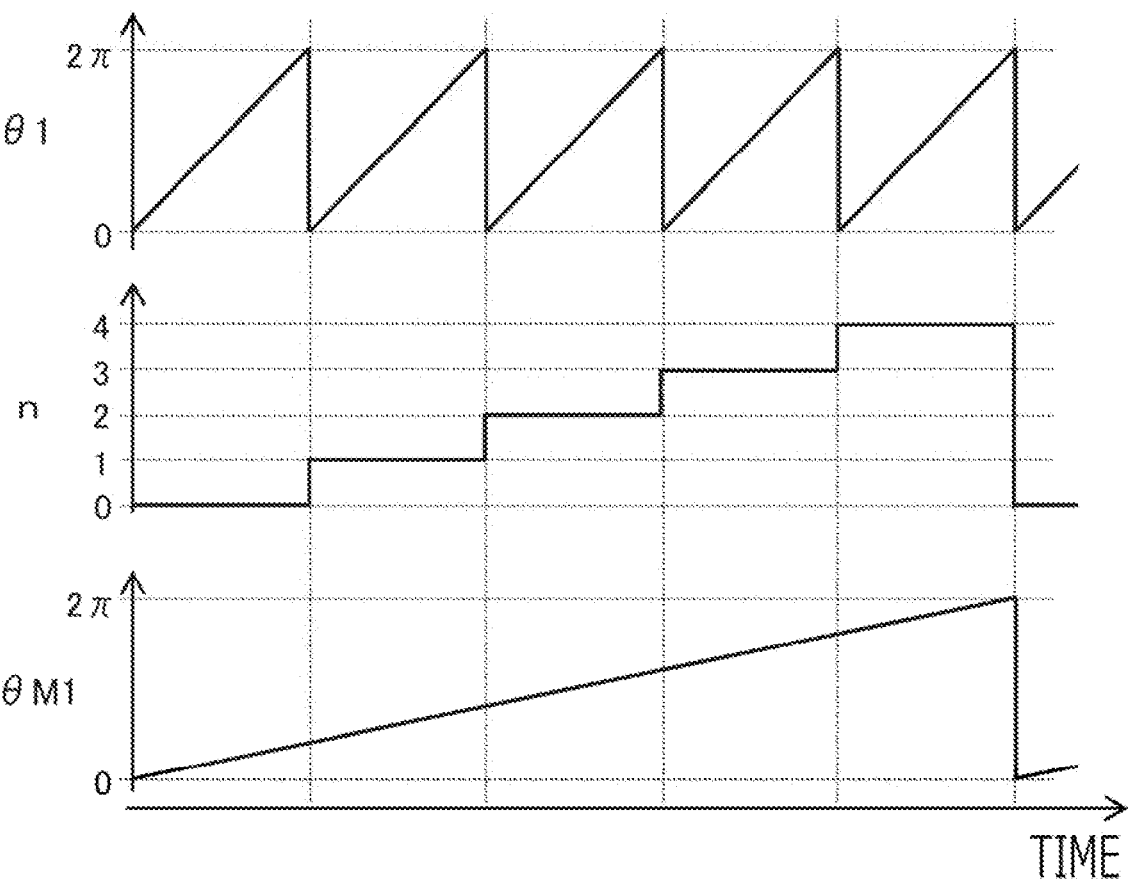
FIG. 12 is a time chart explaining calculation of the angle in the mechanical angle according to Embodiment 1.
FIG. 13 is a figure explaining the stored data of the first system first-order component extraction values according to Embodiment 1.

The first system first-order component reduction processing unit 54A calculates the angle $\theta M1$ (phase) of the one rotation period in the mechanical angle, based on the first angle $\theta1$ in the electrical angle. For example, as shown in FIG. 12 and the next equation, the first system first-order component reduction processing unit 54A calculates the angle $\theta M1$ (phase) in the mechanical angle by adding a value obtained by dividing the first angle $\theta1$ by the shaft angle multiplier N (the number of salient poles N), and a value obtained by multiplying a period number n in the electrical angle to $2\pi$. Whenever the first angle $\theta1$ changes $2\pi$, the period number n in the electrical angle is increased one by one from 0; and when it is increased by one from 4, it is returned to 0.

$$\theta M1 = \theta1/N + n \times 2\pi \qquad (2)$$

Then, as shown in FIG. 13, the first system first-order component reduction processing unit 54A stores a table data between each angle θM1 in the mechanical angle from 0 to 2π, and the first-order component extraction values V1A_1STMM, V2A_1STMM which were calculated at each angle θM1, to the storage apparatus 91, such as RAM. An angle interval ΔθM of the angle θM1 in the mechanical angle of the table data may be set to an angle interval corresponding to the first period TA which is the detection interval of the first system two output signals, or may be set to any angle interval in order to reduce the amount of stored data.

The first-order component which is caused by the eccentricity becomes a similar waveform among the plurality of one rotation periods. Then, the first system first-order component reduction processing unit 54A may store values obtained by performing a statistical processing (for example, an average processing, a first order lag filter processing) to plural times of the first-order component extraction values V1A_1ST, V2A_1ST which were calculated at each angle θM1 in the past plural times of one rotation periods, as the first-order component extraction values V1A_1STMM, V2A_1STMM of each angle θM1. According to this configuration, by the statistical processing, disturbance and noise component can be reduced, and the accuracy of the stored first-order component extraction values can be improved.

<Switching by Storage Condition>

When a preliminarily set storage condition is established, the first system first-order component reduction processing unit 54A calculates the first system two first-order component extraction values V1A_ST, V2A_1ST by performing the first-order component extraction processing; and stores the plurality of calculated first system two first-order component extraction values V1A_1STMM, V2A_1STMM, by correlating with the corresponding phase.

According to this configuration, in the storage condition where the extraction precision of the first-order component extraction values caused by the eccentricity become high, by calculating the first-order component extraction values, and storing the first-order component extraction values by correlating with the phase, the accuracy of the stored first-order component extraction value can be improved.

When the storage condition is not established, the first system first-order component reduction processing unit 54A refers to the plurality of the first system two first-order component extraction values V1A_1STMM, V2A_1STMM which were stored by correlating with the phase, and reads the first system two first-order component extraction values V1A_1STMM, V2A_1STMM corresponding to the present phase (the angle θM1) in the mechanical angle; subtracts the read first system two first-order component extraction values V1A_1STMM, V2A_1STMM from the present detection values of the first system two output signals V1A_F, V2A_F, respectively; and calculates the detection values of the first system two output signals V1A_F*, V2A_F* after the first-order component reduction processing.

According to this configuration, when the storage condition where the extraction precision of the first-order component extraction values caused by the eccentricity becomes high is not established, since the first-order component reduction processing is performed using the first-order component extraction values stored by correlating with the phase when the storage condition is established, the accuracy of the first-order component reduction processing can be improved.

When the storage condition is established, the first system first-order component reduction processing unit 54A subtracts the present first system two first-order component extraction values V1A_1ST, V2A_1ST calculated by the first-order component extraction processing, from the present detection values of the first system two output signals V1A_F, V2A_F, respectively; and calculates the detection values of the first system two output signals V1A_F*, V2A_F* after the first-order component reduction processing.

If the statistical processing value is stored, also when the storage condition is established, similarly to when the storage condition is not established, the first system first-order component reduction processing unit 54A may refer to the plurality of the first system two first-order component extraction values V1A_1STMM, V2A_1STMM which were stored by correlating with the phase, and read the first system two first-order component extraction values V1A_1STMM, V2A_1STMM corresponding to the present phase (the angle θM1) in the mechanical angle; and may perform the first-order component reduction processing using the read first system two first-order component extraction values V1A_1STMM, V2A_1STMM.

The first system first-order component reduction processing unit 54A determines that the storage condition is established, when the first angular speed ω1 is larger than a preliminarily set speed threshold value ωth; and determines that the storage condition is not established, when the first angular speed ω1 is less than or equal to the speed threshold value ωth.

If a variation component is included in the actual angle of the rotor 14, the first-order component extraction value includes not only variation of the output signal due to the eccentricity but also the component due to the actual angular variation; the component due to the actual angular variation is also reduced by the first-order component reduction processing; and the detection error of the angle is caused. On the other hand, there is the maximum frequency in the frequency of the actual angular variation, and the actual angular variation decreases in the frequency greater than or equal to the maximum frequency. When the rotational frequency of the rotor 14 is higher than the maximum frequency of the actual angular variation, the variation component of the actual angle included in the first-order component extraction value decreases. For example, if the maximum frequency of the actual angular variation is 50 Hz in the mechanical angle, the speed threshold value ωth is preliminarily set to an angular speed corresponding to 50 Hz. By setting in this way, since the first-order component extraction value is stored on the condition where the variation component of the actual angle included in the first-order component extraction value decreases, the accuracy of the first-order component extraction value can be improved.

<Block Diagram According to Storage and Read of First-Order Component Extraction Value>

In the present embodiment, as shown in FIG. 11, the first system first-order component reduction processing unit 54A is provided with a mechanical angle calculation device 545A, a storage condition determination device 546A, a first first-order component storage device 547A, a second first-order component storage device 548A, a first switching device 549A, and a second switching device 550A.

As mentioned above, the mechanical angle calculation device 545A calculates the angle θM1 in the mechanical angle, based on the first angle θ1. As mentioned above, the storage condition determination device 546A determines whether the storage condition is established, based on the first angular speed ω1. As mentioned above, when the storage condition is established, the first first-order component storage device 547A stores the first first-order component extraction value V1A_1ST calculated by the first first-order component extractor 541A, by correlating with the corresponding angle θM1 in the mechanical angle. When the storage condition is not established, the first first-order component storage device 547A refers to the plurality of first first-order component extraction values V1A_1STMM stored by correlating with the angle θM1 in the mechanical angle; and reads and outputs the first first-order component extraction value V1A_1STMM corresponding to the present angle θM1 in the mechanical angle. The first switching device 549A selects and outputs the first first-order component extraction value V1A_1ST calculated by the first first-order component extractor 541A, when the storage condition is established; and selects and outputs the first first-order component extraction value V1A_1STMM calculated by the first first-order component storage device 547A, when the storage condition is not established. The first subtractor 543A subtracts the first first-order component extraction value outputted by the first switching device 549A, from the detection value of the first output signal V1A_F; and outputs the detection value of the first output signal V1A_F* after the first-order component reduction processing.

As mentioned above, when the storage condition is established, the second first-order component storage device 548A stores the second first-order component extraction value V2A_1ST calculated by the second first-order component extractor 542A, by correlating with the corresponding angle θM1 in the mechanical angle. When the storage condition is not established, the second first-order component storage device 548A refers to the plurality of second first-order component extraction values V2A_1STMM stored by correlating with the angle θM1 in the mechanical angle; and reads and outputs the second first-order component extraction value V2A_1STMM corresponding to the present angle θM1 in the mechanical angle. The second switching device 550A selects and outputs the second first-order component extraction value V2A_1ST calculated by the second first-order component extractor 542A, when the storage condition is established; and selects and outputs the second first-order component extraction value V2A_1STMM calculated by the second first-order component storage device 548A, when the storage condition is not established. The second subtractor 544A subtracts the second first-order component extraction value outputted by the second switching device 550A, from the detection value of the second output signal V2A_F; and outputs the detection value of the second output signal V2A_F* after the first-order component reduction processing.

1-2-2-4. First System Angle Calculation Unit

As shown in the next equation, the first system angle calculation unit 55A calculates the first angle θ1 in the electrical angle, by calculating an arc tangent (an arc tangent function) of a ratio between the detection value of the first system first output signal V1A_F* and the detection value of the first system second output signal V2A_F* to which the second period reduction processing and the first-order component reduction processing were performed. The first angle in the mechanical angle may be calculated.

$$\theta 1 = \tan^{-1}(V1A\_F^*/V2A\_F^*) \tag{3}$$

1-2-2-5. First System Rotational Speed Calculation Unit

The first system rotational speed calculation unit 56A calculates the first angular speed ω1, based on a time change of the first angle θ1. For example, the first system rotational speed calculation unit 56A calculates the first angular speed ω1 in the electrical angle by dividing a deviation between the first angle θ1 calculated at this time calculation period, and the first angle θ1_old calculated at the last time calculation period, by the calculation period Ts. The first angular speed in the mechanical angle may be calculated.

$$\omega 1 = (\theta 1 - \theta 1\_old)/Ts \tag{4}$$

1-2-3-1. Second System Output Signal Detection Unit

The second system output signal detection unit 52B detects periodically the output signals V1B, V2B of the second system two output windings 111B, 112B at preliminarily set detection timing (hereinafter, referred to also as the second system detection timing). The output signal of the second system first output winding 111B is referred to as a second system first output signal V1B, and the output signal of the second system second output winding 112B is referred to as a second system second output signal V2B.

In the present embodiment, the second system output signal detection unit 52B detects the second system two output signals V1B, V2B at a timing when the AC voltage VRB of the second period TB applied to the second system excitation winding 10B becomes the maximum value or the minimum value (in this example, the maximum value). The second system output signal detection unit 52B detects the second system two output signals V1B, V2B at every the second period TB when the AC voltage VRB becomes the maximum value. That is to say, the second system detection timing is set to the timing at every the second period TB.

1-2-3-2. Second System First Period Reduction Processing Unit

Figure 14:
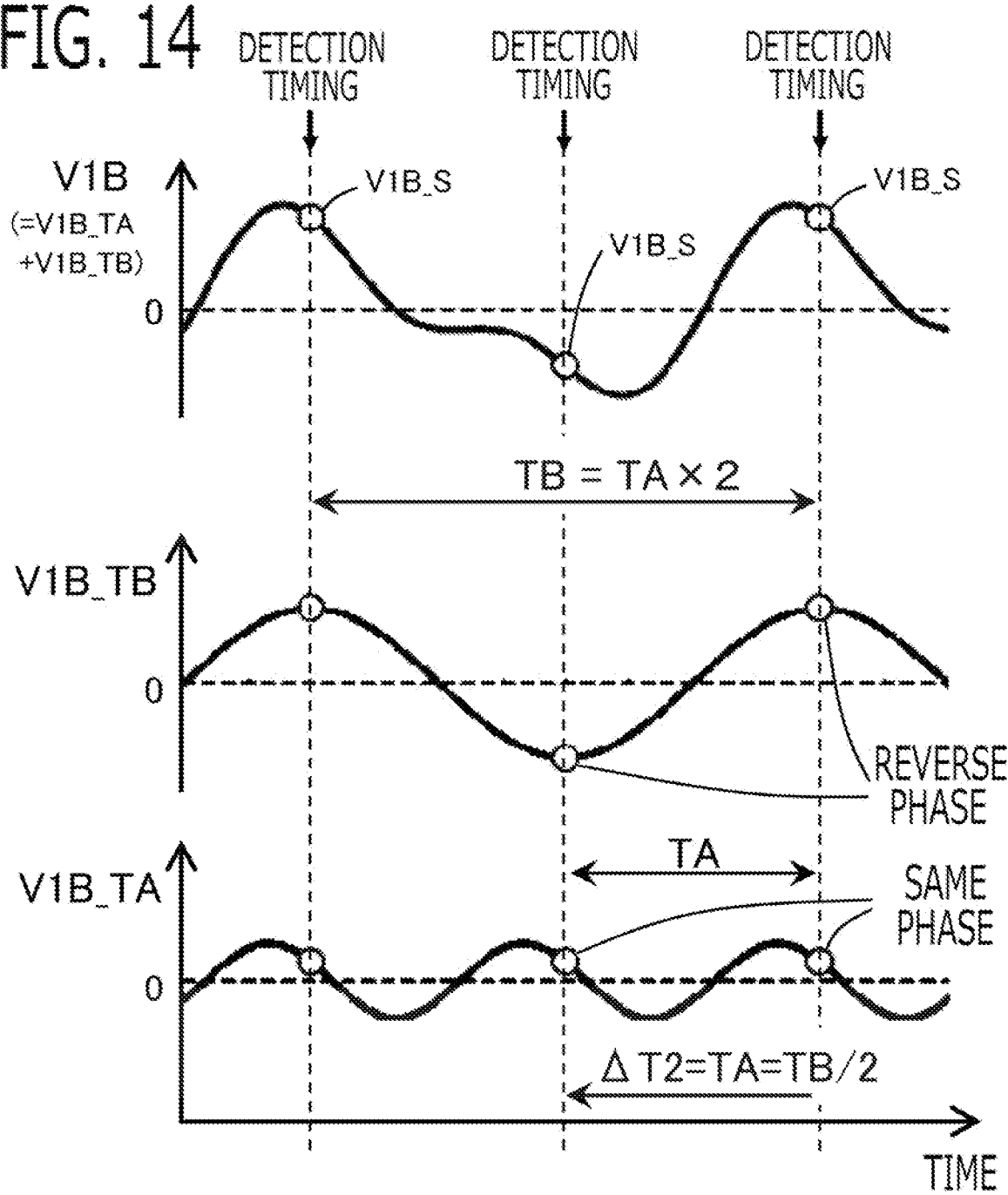
FIG. 14 is a time chart for explaining the second system first period reduction processing according to Embodiment 1.

As showing an example of the second system first output signal V1B in FIG. 14, the components of the first period induced by the magnetic flux of the first period TA excited in the first system excitation winding 10A are superimposed on the second system two output signals V1B, V2B, respectively, due to the magnetic interference between systems. The second system first output signal V1B is shown in the upper row graph of FIG. 14; the component of the second period V1B_TB induced by the magnetic flux of the second system excitation winding 10B included in the second system first output signal V1B is shown in the middle graph; and the component of the first period V1B_TA induced by the magnetic flux of the first system excitation winding 10A included in the second system first output signal V1B is shown in the lower row graph. The second system first output signal V1B becomes a signal obtained by totaling the component of the second period V1B_TB and the component of the first period V1B_TA, and if the angle is calculated with these signals, the detection error will occur. Therefore, in order to suppress the detection error of the angle, it is necessary to reduce the component of the first period V1B_TA from the second system first output signal V1B.

Then, the second system first period reduction processing unit 53B performs a first period reduction processing which reduces the component of the first period, to the detection values of the second system two output signals V1B_S, V2B_S.

In the present embodiment, the first period reduction processing is performed based on a principle explained in the following. As shown in the lower row graph of FIG. 14, the component of the first period V1B_TA of the output signal of the second system first output winding becomes the same phase and becomes the equivalent value with the same sign of plus or minus at an integral multiple period of the first period TA (for example, the first period TA).

Then, as the first period component reduction processing, the second system reduction processing unit 53B performs a subtraction processing that calculates differences between the detection values of the second system two output signals V1B_S, V2B_S detected at this time detection timing, and the detection values of the second system two output signals V1B_Sold, V2B_Sold detected at the detection timing earlier by the second system reduction processing interval ΔT2 than this time detection timing. The second system reduction processing interval ΔT2 is set to an integral multiple of the first period TA, as shown in the next equation. Herein, P is an integer greater than or equal to 1. In the present embodiment, P is set to 1, and the second system reduction processing interval ΔT2 is set to the first period TA.

$$\Delta T2 = TA \times P \qquad (5)$$

Figure 15:
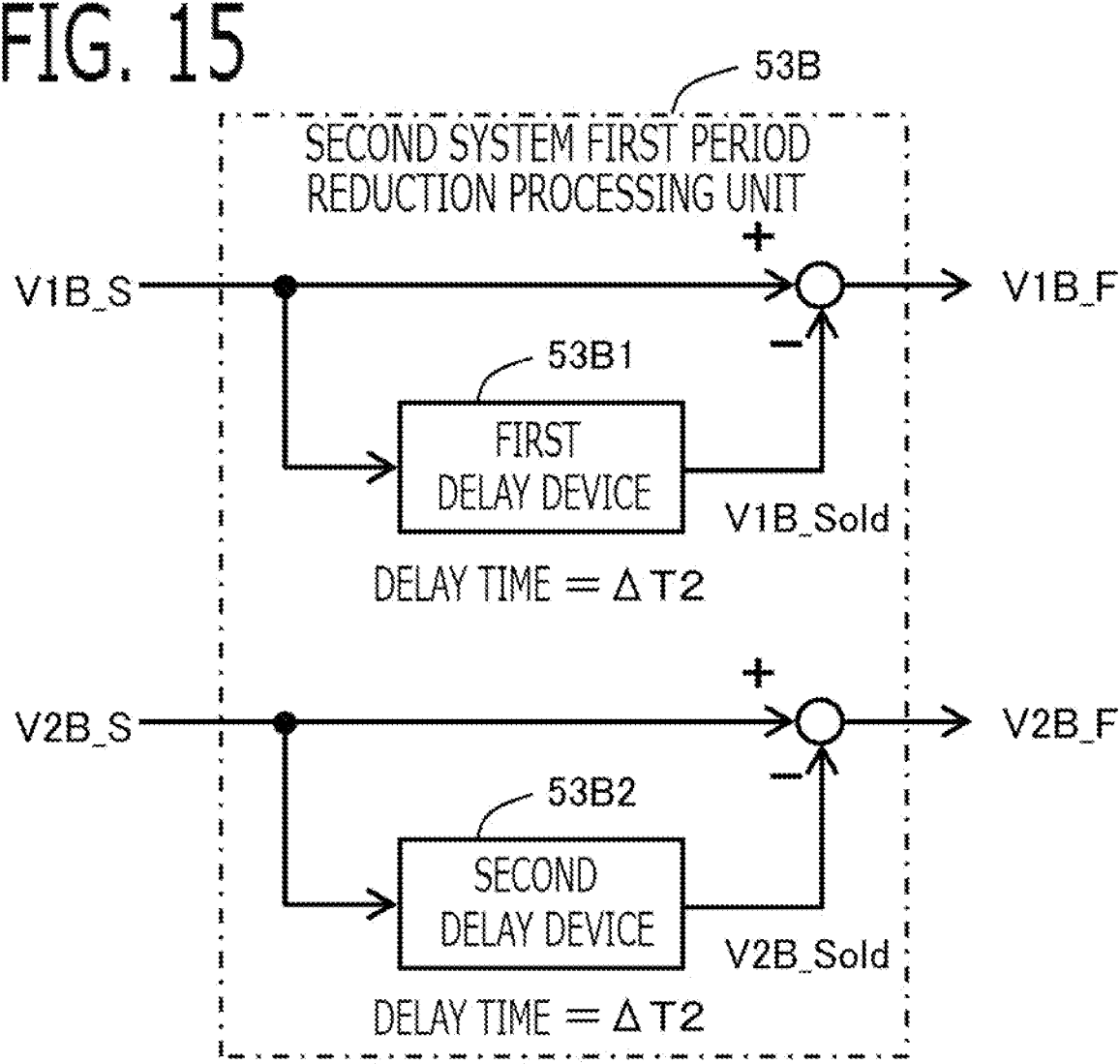
FIG. 15 is a block diagram of the second system first period reduction processing unit according to Embodiment 1.

The second system first period reduction processing unit 53B is configured, for example, as shown in FIG. 15. The second system first period reduction processing unit 53B is provided with a first delay device 53B1 which delays the detection value of the second system first output signal V1B_S by the second system reduction processing interval ΔT2, and outputs; subtracts the output V1B_Sold of the first delay device 53B1 from the detection value of the second system first output signal V1B_S; and calculates the detection value of the second system first output signal V1B_F after the first period reduction processing. Similarly, the second system first period reduction processing unit 53B is provided with a second delay device 53B2 which delays the detection value of the second system second output signal V2B_S by the second system reduction processing interval ΔT2, and outputs; subtracts the output V2B_Sold of the second delay device 53B2 from the detection value of the second system second output signal V2B_S; and calculates the detection value of the second system second output signal V2B_F after the first period reduction processing.

According to this configuration, the two components of the first period which become the equivalent values with the same sign of plus or minus with each other are subtracted, and the two components of the first period are canceled with each other. Accordingly, in the detection values of the output signals of the second system two output windings V1B_F, V2B_F after subtraction, the component of the first period due to the AC voltage VRA of the first period TA is reduced, and the influence of the magnetic interference can be reduced.

1-2-3-3. Second System First-Order Component Reduction Processing Unit

<Superimposing of First-Order Component Due to Eccentricity of Rotor>

Figure 16:
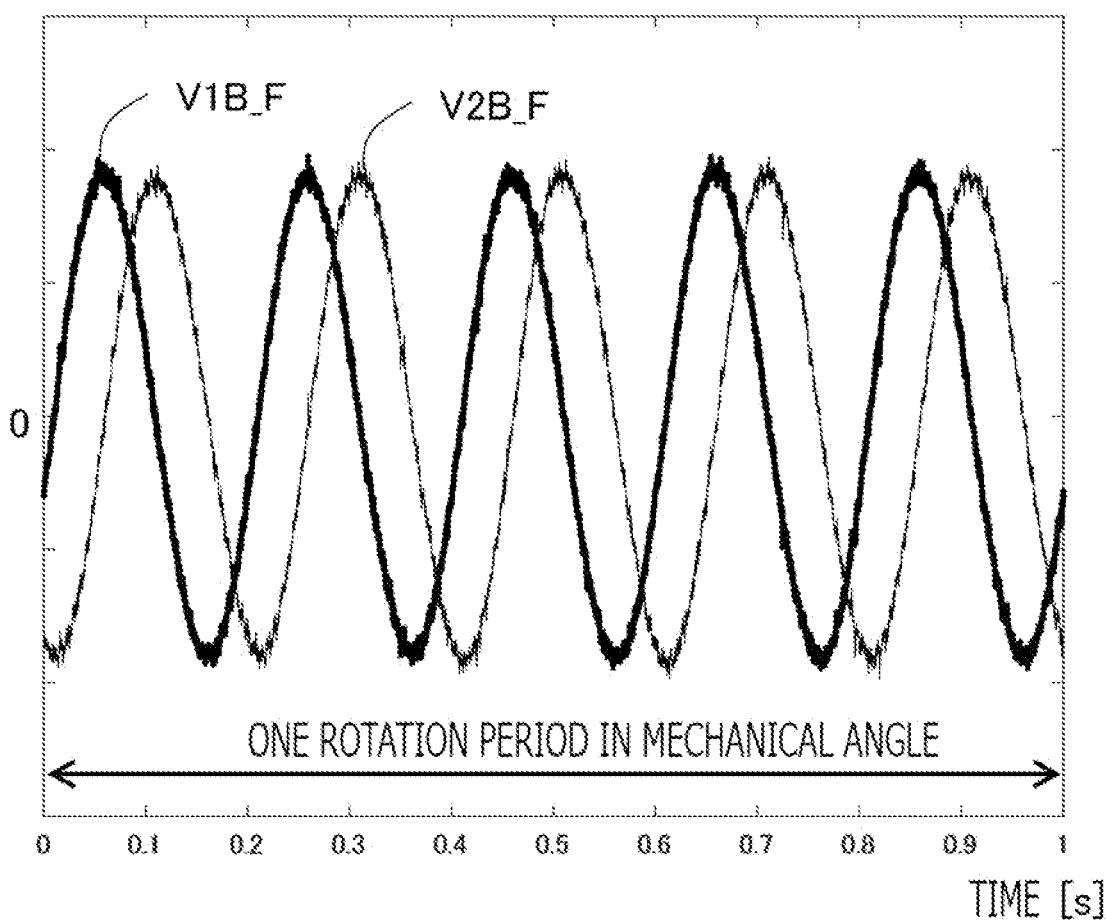
FIG. 16 is a time chart of the second system two output signals when the eccentricity does not occur according to Embodiment 1.
Figure 17:
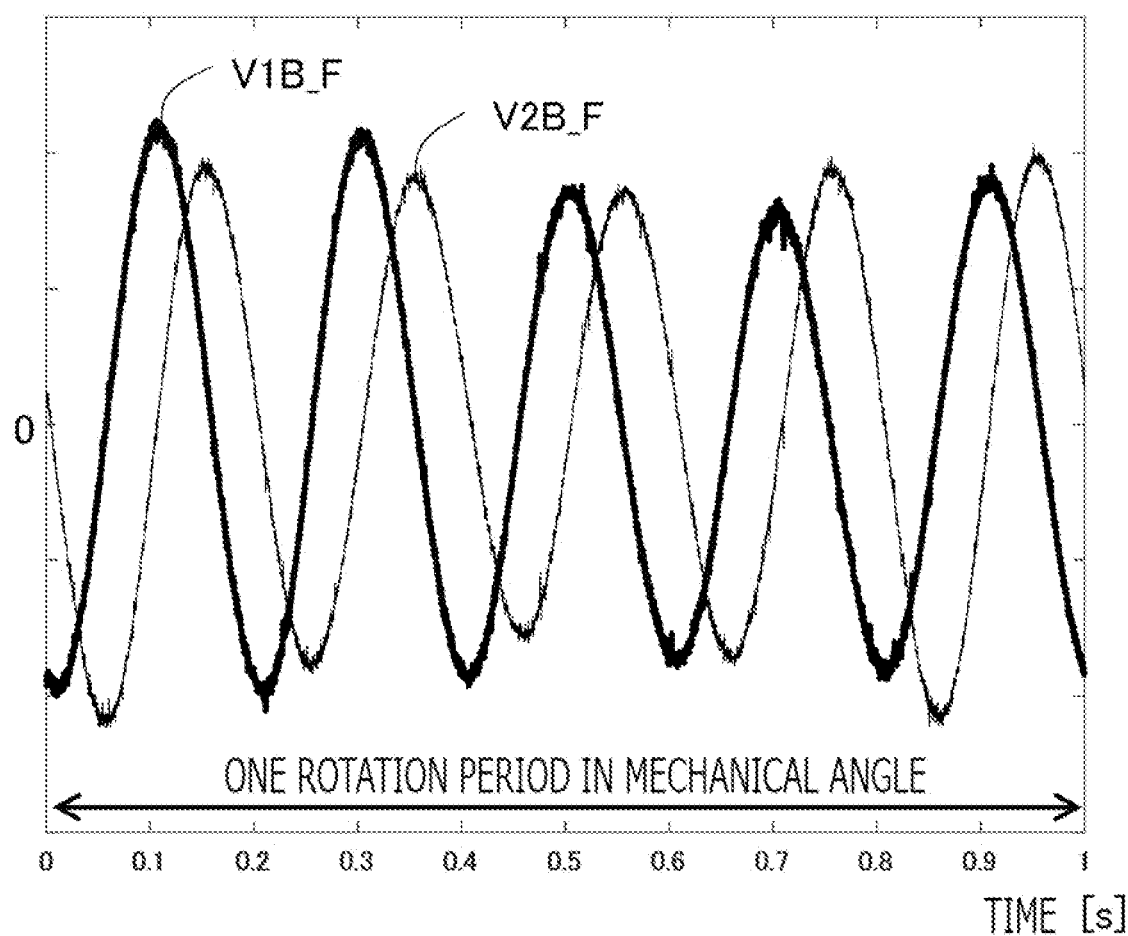
FIG. 17 is a time chart of the second system two output signals when the eccentricity occurs according to Embodiment 1.

FIG. 16 shows a time waveform of the detection values of the second system two output signals V1B_F, V2B_F after the first period reduction processing when the eccentricity does not occur, and FIG. 17 shows a time waveform of the detection values of the second system two output signals V1B_F, V2B_F after the first period reduction processing when the eccentricity occurs. The rotor 14 is rotating one time in 1 second.

Similarly to the first system, when the eccentricity occurs, variation of the one rotation period in the mechanical angle occurs in the detection values of the second system two output signals V1B_F, V2B_F. For example, an amplitude of the detection value of the first output signal V1B_F and an amplitude of the detection value of the second output signal V2B_F vary at the one rotation period in the mechanical angle. A vibration center of the detection value of the first output signal V1B_F and a vibration center of the detection value of the second output signal V2B_F vary at the one rotation period in the mechanical angle. That is to say, the detection value of the first output signal V1B_F and the detection value of the second output signal V2B_F vary in an offset manner at the one rotation period in the mechanical angle. Therefore, a second angle θ2 calculated based on a divided value (V1B_F/V2B_F) obtained by dividing the detection value of the first output signal V1B_F by the detection value of the second output signal V2B_F varies due to the eccentricity, and an error occurs.

Figure 18:
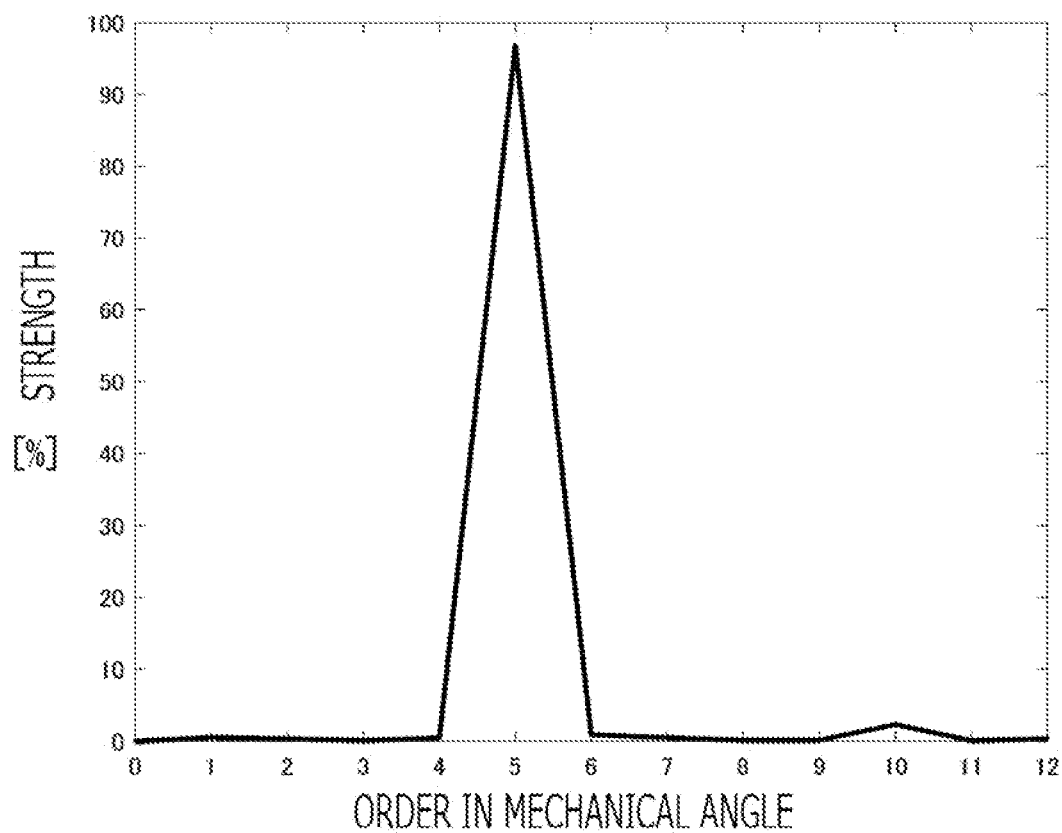
FIG. 18 is a figure showing frequency analysis result of the second system two output signals when the eccentricity does not occur according to Embodiment 1.
Figure 19:
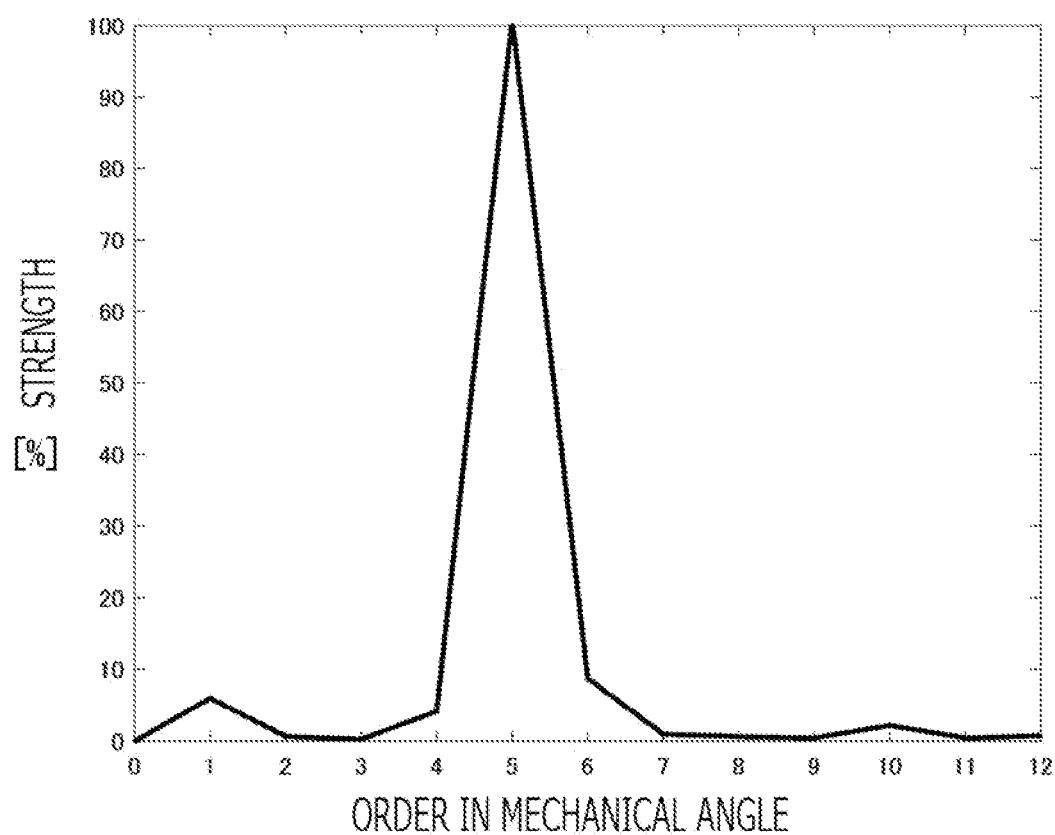
FIG. 19 is a figure showing frequency analysis result of the second system two output signals when the eccentricity occurs according to Embodiment 1.

FIG. 18 shows a result obtained by performing a frequency analysis (FFT) to the detection value of the first output signal V1B_F shown in FIG. 16 when the eccentricity does not occur, and FIG. 19 shows a result obtained by performing a frequency analysis (FFT) to the detection value of the first output signal V1B_F shown in FIG. 17 when the eccentricity occurs.

Similarly to the first system, compared with the case where the eccentricity does not occur, in the case where the eccentricity occurs, the first-order frequency component in the mechanical angle (the component of the one rotational frequency in the mechanical angle) increases. Similarly to the first system, due to the offset variation of the one rotation period in the mechanical angle in the detection values of the second system two output signals, the fourth-order and the sixth-order error components in the mechanical angle occurs in the second angle θ2. And, due to the variation of the one rotation period in the mechanical angle in the amplitude of the detection values of the second system two output signals, the tenth-order error component in the mechanical angle occurs in the second angle θ2. Therefore, if the resolver 1 is used as the rotational angle sensor of the motor, the fourth-order, the sixth-order, and the tenth-order torque ripples in the mechanical angle occur, and these worsen the driving performance.

Although it is also possible to perform a reduction processing which reduces the fourth-order, the sixth-order, and the tenth-order error components of the second angle θ2, it is necessary to perform reduction processing about a plurality of high order frequency bands, and it is not easy to realize an accurate reduction processing due to restriction of increase in the calculation processing load and restriction of increase in the sampling frequency. Therefore, by performing the reduction processing about smallest possible number of frequency bands and the lowest possible order of frequency band, it is desired to reduce the error of the second angle θ2 which is caused by the eccentricity.

<First-Order Component Reduction Processing>

Then, the second system first-order component reduction processing unit 54B performs a first-order component reduction processing which reduces the first-order component which is a component of the one rotation period (or the one rotational frequency) in the mechanical angle of the rotor, to each of the second system two output signals.

According to this configuration, by reducing the error component of the first-order mechanical angle that is caused by the eccentricity, from the second system two output signals, the fourth-order, the sixth-order and the tenth-order error components that are caused by the eccentricity can be reduced from the second angle θ2 calculated based on the second system two output signals. Since the reduction processing which reduces the first-order component of low order about the one frequency band is performed, the accuracy of the reduction processing can be improved, while suppressing the increase in the calculation processing load and suppressing the increase in the sampling frequency.

In the present embodiment, the second system first-order component reduction processing unit 54B calculates a detection value of the second system first output signal V1B_F* after the first-order component reduction processing by performing the first-order component reduction processing to the detection value of the second system first output signal V1B_F after the first period reduction processing; and calculates a detection value of the second system second output signal V2B_F* after the first-order component reduction processing by performing the first-order component reduction processing to the detection value of the second system second output signal V2B_F after the first period reduction processing.

In the first-order component reduction processing, the second system first-order component reduction processing unit 54B calculates second system two first-order component extraction values V1B_1ST, V2B_1ST by performing the first-order component extraction processing which extracts the first-order component in the mechanical angle, to each of the detection values of the second system two output signals V1B_F, V2B_F; and calculates detection values of the second system two output signals V1B_F*, V2B_F* after the first-order component reduction processing by subtracting the second system two first-order component extraction values V1B_1ST, V2B_1ST from the detection values of the second system two output signals V1B_F, V2B_F, respectively.

Figure 20:
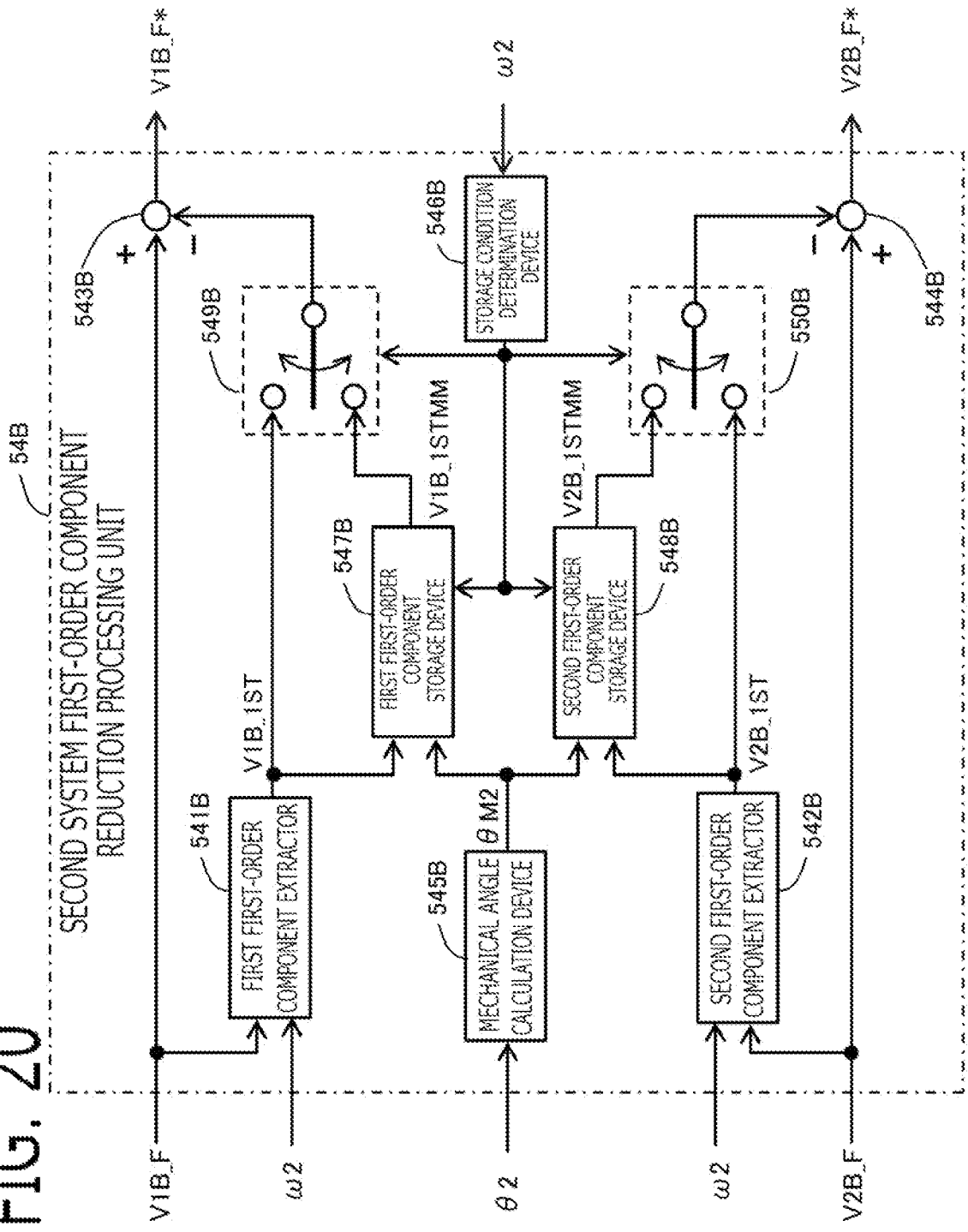
FIG. 20 is a block diagram of the second system first-order component reduction processing unit according to Embodiment 1.

The second system first-order component reduction processing unit 54B is configured, for example, as shown in FIG. 20. The second system first-order component reduction processing unit 54B is provided with a first first-order component extractor 541B, a second first-order component extractor 542B, a first subtractor 543B, a second subtractor 544B, and the like.

The first first-order component extractor 541B performs the first-order component extraction processing to the inputted detection value of the second system first output signal V1B_F, and outputs the second system first first-order component extraction value V1B_1ST. The first subtractor 543B subtracts the second system first first-order component extraction value V1B_1ST outputted via the first switching device 549B described below, from the detection value of the second system first output signal V1B_F, and outputs the detection value of the second system first output signal V1B_F* after the first-order component reduction processing. The second first-order component extractor 542B performs the first-order component extraction processing to the inputted detection value of the second system second output signal V2B_F, and outputs the second system second first-order component extraction value V2B_1ST. The second subtractor 544B subtracts the second system second first-order component extraction value V2B_1ST outputted via the second switching device 550B described below, from the detection value of the second system second output signal V2B_F, and outputs the detection value of the second system second output signal V2B_F* after the first-order component reduction processing.

Similarly to the first system, the first-order component extraction processing is a band pass filter processing which passes the first-order component (component of the one rotational frequency) in the mechanical angle. Various kinds of methods are used for the band pass filter processing.

The first and the second first-order component extractors 541B, 542B change the first-order frequency (the one rotational frequency) in the mechanical angle to which the first-order component reduction processing is performed, based on the second angular speed ω2 calculated by the second system rotational speed calculation unit 56B described below. If the second angular speed ω2 is an angular speed in the electrical angle, the first-order frequency in the mechanical angle becomes ω2/2π/N.

Alternatively, in the first-order component reduction processing, the second system first-order component reduction processing unit 54B may perform a band stop filter processing which reduces the first-order component in the mechanical angle, to each of the detection values of the second system two output signals V1B_F, V2B_F, and directly calculate the detection values of the second system two output signals V1B_F*, V2B_F* after the first-order component reduction processing. In this case, the first-order frequency (the one rotational frequency) in the mechanical angle to which the band stop filter processing is performed is changed based on the second angular speed ω2 calculated by the second system rotational speed calculation unit 56B.

<Storage and Read of First-Order Component Extraction Value>

In the present embodiment, the second system first-order component reduction processing unit 54B stores a plurality of the second system two first-order component extraction values V1B_1ST, V2B_1ST calculated at each phase (each angle θM2) of the one rotation period in the mechanical angle, by correlating with the corresponding phase (the angle θM2). Then, the second system first-order component reduction processing unit 54B refers to the plurality of the second system two first-order component extraction values V1B_1STMM, V2B_1STMM which were stored by correlating with the phase, and reads the second system two first-order component extraction values V1B_1STMM, V2B_1STMM corresponding to the present phase (the angle θM2) of the one rotation period in the mechanical angle; subtracts the read second system two first-order component extraction values V1B_1STMM, V2B_1STMM from the present detection values of the second system two output signals V1B_F, V2B_F, respectively; and calculates the detection values of the second system two output signals V1B_F*, V2B_F* after the first-order component reduction processing.

The second system first-order component reduction processing unit 54B calculates the angle θM2 (phase) of the one rotation period in the mechanical angle, based on the second angle θ2 in the electrical angle. Similarly to the first system, for example, as shown in the next equation, the second system first-order component reduction processing unit 54B calculates the angle θM2 (phase) in the mechanical angle by adding a value obtained by dividing the second angle θ2 by the shaft angle multiplier N (the number of salient poles N), and a value obtained by multiplying a period number n in the electrical angle to 2π. Whenever the second angle θ2 changes 2π, the period number n in the electrical angle is increased one by one from 0; and when it is increased by one from 4, it is returned to 0.

$$\theta M2 = \theta 2/N + n \times 2\pi \quad (6)$$

Figures 21, 22:
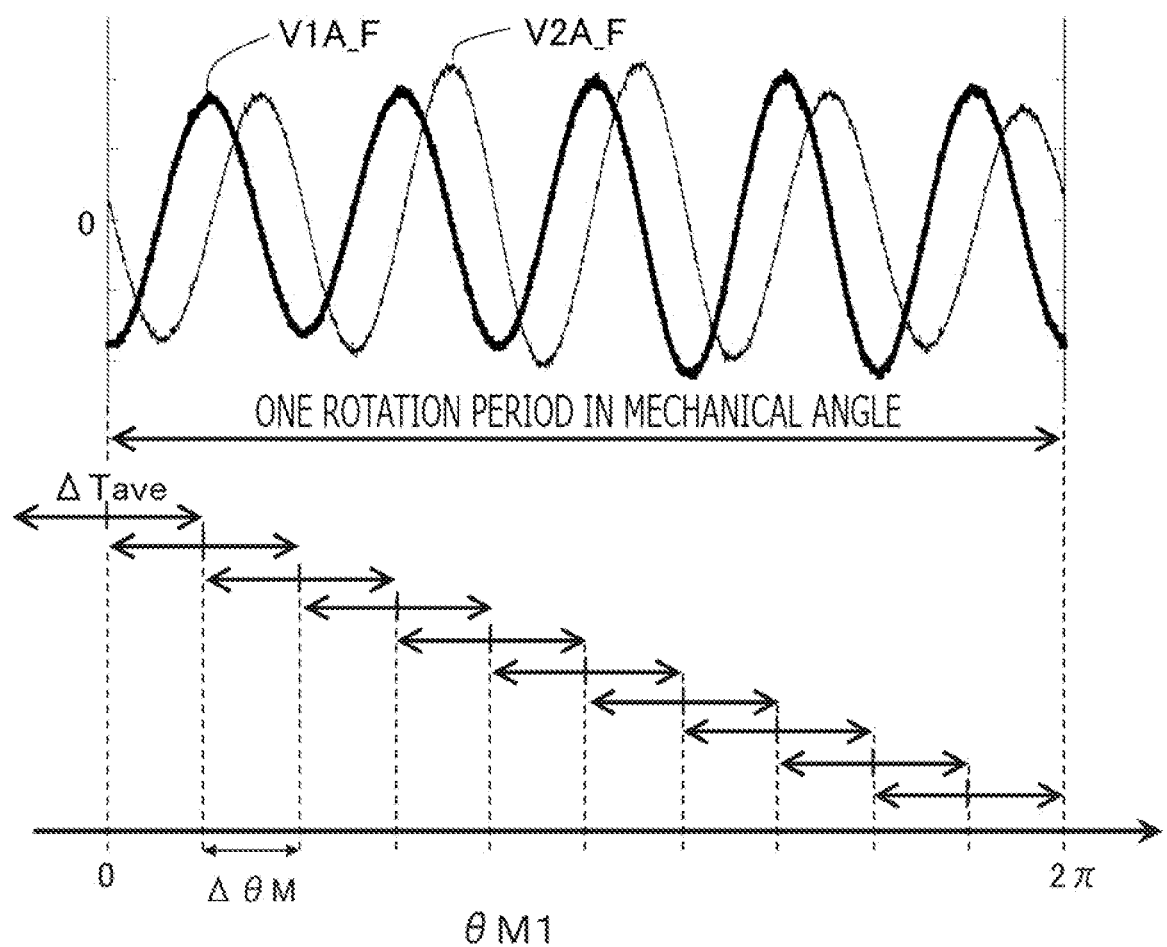
FIG. 21 is a figure explaining the stored data of the second system first-order component extraction values according to Embodiment 1.
FIG. 22 is a figure for explaining the first system first-order component extraction processing according to Embodiment 2.

Then, as shown in FIG. 21, the second system first-order component reduction processing unit 54B stores a table data between each angle θM2 in the mechanical angle from 0 to 2π, and the first-order component extraction values V1B_1STMM, V2B_1STMM which were calculated at each angle θM2, to the storage apparatus 91, such as RAM. An angle interval ΔθM of the angle θM2 in the mechanical angle of the table data may be set to an angle interval corresponding to the second period TB which is the detection interval of the second system two output signals, or may be set to any angle interval in order to reduce the amount of stored data.

The first-order component which is caused by the eccentricity becomes a similar waveform among the plurality of one rotation periods. Then, the second system first-order component reduction processing unit 54B may store a value obtained by performing a statistical processing (for example, an average processing, a first order lag filter processing) to plural times of the first-order component extraction value V1B_1ST, V2B_1ST which were calculated at each angle θM2 in the past plural times of one rotation periods, as the first-order component extraction values V1B_1STMM, V2B_1STMM of each angle θM2. According to this configuration, by the statistical processing, disturbance and noise component can be reduced, and the accuracy of the stored first-order component extraction values can be improved.

<Switching by Storage Condition>

When a preliminarily set storage condition is established, the second system first-order component reduction processing unit 54B calculates the second system two first-order component extraction values V1B_1ST, V2B_1ST by performing the first-order component extraction processing; and stores the plurality of calculated second system two first-order component extraction values V1B_1STMM, V2B_1STMM, by correlating with the corresponding phase.

When the storage condition is not established, the second system first-order component reduction processing unit 54B may refer to the plurality of the second system two first-order component extraction values V1B_1STMM, V2B_1STMM which were stored by correlating with the phase, and read the second system two first-order component extraction values V1B_1STMM, V2B_1STMM corresponding to the present phase (the angle θM2) in the mechanical angle; and subtracts the read second system two first-order component extraction values V1B_1STMM, V2B_1STMM from the present detection values of the second system two output signals V1B_F, V2B_F, respectively; and calculates the detection values of the second system two output signals V1B_F*, V2B_F* after the first-order component reduction processing.

When the storage condition is established, the second system first-order component reduction processing unit 54B subtracts the present second system two first-order component extraction values V1B_1ST, V2B_1ST calculated by the first-order component extraction processing, from the present detection values of the second system two output signals V1B_F, V2B_F, respectively; and calculates the detection values of the second system two output signals V1B_F*, V2B_F* after the first-order component reduction processing.

If the statistical processing value is stored, also when the storage condition is established, similarly to when the storage condition is not established, the second system first-order component reduction processing unit 54B may refer to the plurality of the second system two first-order component extraction values V1B_1STMM, V2B_1STMM which were stored by correlating with the phase, and read the second system two first-order component extraction values V1B_1STMM, V2B_1STMM corresponding to the present phase (the angle θM2) in the mechanical angle; and may perform the first-order component reduction processing using the read second system two first-order component extraction values V1B_1STMM, V2B_1STMM.

The second system first-order component reduction processing unit 54B determines that the storage condition is established, when the second angular speed ω2 is larger than a preliminarily set speed threshold value ωth; and determines that the storage condition is not established, when the second angular speed ω2 is less than or equal to the speed threshold value ωth.

Similarly to the first system, for example, if the maximum frequency of the actual angular variation is 50 Hz in the mechanical angle, the speed threshold value ωth is preliminarily set to an angular speed corresponding to 50 Hz.

<Block Diagram According to Storage and Read of First-Order Component Extraction Value>

In the present embodiment, as shown in FIG. 20, the second system first-order component reduction processing unit 54B is provided with a mechanical angle calculation device 545B, a storage condition determination device 546B, a first first-order component storage device 547B, a second first-order component storage device 548B, a first switching device 549B, and a second switching device 550B.

As mentioned above, the mechanical angle calculation device 545B calculates the angle θM2 in the mechanical angle, based on the second angle θ2. As mentioned above, the storage condition determination device 546B determines whether the storage condition is established, based on the second angular speed ω2. As mentioned above, when the storage condition is established, the second first-order component storage device 547B stores the first first-order component extraction value V1B_1ST calculated by the first first-order component extractor 541B, by correlating with the corresponding angle θM2 in the mechanical angle. When the storage condition is not established, the first first-order component storage device 547B refers to the plurality of first first-order component extraction values V1B_1STMM stored by correlating with the angle θM2 in the mechanical angle; and reads and outputs the first first-order component extraction value V1B_1STMM corresponding to the present angle θM2 in the mechanical angle. The first switching device 549B selects and outputs the first first-order component extraction value V1B_1ST calculated by the first first-order component extractor 541B, when the storage condition is established; and selects and outputs the first first-order component extraction value V1B_1STMM calculated by the first first-order component storage device 547B, when the storage condition is not established. The first subtractor 543B subtracts the first first-order component extraction value outputted by the first switching device 549B, from the detection value of the first output signal V1B_F; and outputs the detection value of the first output signal V1B_F* after the first-order component reduction processing.

As mentioned above, when the storage condition is established, the second first-order component storage device 548B stores the second first-order component extraction value V2B_1ST calculated by the second first-order component extractor 542B, by correlating with the corresponding angle θM2 in the mechanical angle. When the storage condition is not established, the second first-order component storage device 548B refers to the plurality of second first-order component extraction values V2B_1STMM stored by correlating with the angle θM2 in the mechanical angle; and reads and outputs the second first-order component extraction value V2B_1STMM corresponding to the present angle θM2 in the mechanical angle. The second switching device 550B selects and outputs the second first-order component extraction value V2B_1ST calculated by the second first-order component extractor 542B, when the storage condition is established; and selects and outputs the second first-order component extraction value V2B_1STMM calculated by the second first-order component storage device 548B, when the storage condition is not established. The second subtractor 544B subtracts the second first-order component extraction value outputted by the second switching device 550B, from the detection value of the second output signal V2B_F; and outputs the detection value of the second output signal V2B_F* after the first-order component reduction processing.

1-2-3-4. Second System Angle Calculation Unit

As shown in the next equation, the second system angle calculation unit 55B calculates the second angle θ2 in the electrical angle, by calculating an arc tangent (an arc tangent function) of a ratio between the detection value of the second system first output signal V1B_F* and the detection value of the second system second output signal V2B_F* to which the first period reduction processing and the first-order component reduction processing were performed. The second angle in the mechanical angle may be calculated.

$$\theta 2 = \tan^{-1}(V1B\_F^*/V2B\_F^*) \quad (7)$$

1-2-3-5. Second System Rotational Speed Calculation Unit

The second system rotational speed calculation unit 56B calculates the second angular speed ω2, based on a time change of the second angle θ2. For example, the second system rotational speed calculation unit 56B calculates the second angular speed ω2 in the electrical angle by dividing a deviation between the second angle θ2 calculated at this time calculation period, and the second angle θ2_old calculated at the last time calculation period, by the calculation period Ts. The second angular speed in the mechanical angle may be calculated.

$$\omega 2 = (\theta 2 - \theta 2\_old)/Ts \quad (8)$$

2. Embodiment 2

Next, the angle detection apparatus according to Embodiment 2 will be explained. The explanation for constituent parts the same as those in Embodiment 1 will be omitted. The basic configuration of the angle detection apparatus according to the present embodiment is the same as that of Embodiment 1. Embodiment 2 is different from Embodiment 1 in configuration of the first system first-order component reduction processing unit 54A and the second system first-order component reduction processing unit 54B.

2-1. First System First-Order Component Reduction Processing Unit

<Extraction of First-Order Component Due to Eccentricity, by Statistical Processing of One Rotation Period in Electrical Angle>

As shown in FIG. 7 and FIG. 8, the detection values of the first system two output signals V1A_F, V2A_F are varied at the one rotation period in the electrical angle obtained by dividing the one rotation period in the mechanical angle by the number of salient poles N (in this example, 5). Accordingly, in order to extract offset-like variation that the vibration centers of the detection values of two output signals V1A_F, V2A_F varies at the one rotation period in the mechanical angle due to the eccentricity, a statistical processing (for example, an average processing) may be performed to the detection values of two output signals V1A_F, V2A_F in the one rotation period in the electrical angle.

Then, in the present embodiment, in the first-order component reduction processing, the first system first-order component reduction processing unit 54A calculates the first system two first-order component extraction values V1A_1ST, V2A_1ST by performing a statistical processing to the first system two output signals V1A_F, V2A_F in a statistical processing period ΔTave obtained by dividing a time of the one rotation period in the mechanical angle by N, at each of a plurality of phases (angle θM1) of the one rotation period in the mechanical angle; and stores a plurality of the first system two first-order component extraction values V1A_1STMM, V2A_1STMM calculated at each phase (angle θM1), by correlating with the corresponding phase. The statistical processing period ΔTave corresponds to a time of the one rotation period in the electrical angle.

Similarly to Embodiment 1, the first system first-order component reduction processing unit 54A calculates the angle θM1 (phase) of the one rotation period in the mechanical angle, based on the first angle θ1 in the electrical angle.

The first system first-order component reduction processing unit 54A reads the first system two first-order component extraction values V1A_1STMM, V2A_1STMM corresponding to the present phase, by referring to the plurality of first system two first-order component extraction values V1A_1STMM, V2A_1STMM stored by correlating with the phase; and calculates first system two output signals V1A_F*, V2A_F* after the first-order component reduction processing, by subtracting the read first system two first-order component extraction values V1A_1STMM, V2A_1STMM from the present first system two output signals V1A_F, V2A_F, respectively.

According to this configuration, by calculating the statistical processing value in the statistical processing period ΔTave corresponding to the time of the one rotation period in the electrical angle at each phase, offset-like variations of the detection values of two output signals due to the eccentricity in the one rotation period in the mechanical angle can be extracted. Then, the extracted first-order component extraction values is stored by correlating with the corresponding phase; the first-order component extraction value corresponding to the present phase is calculated by referring to the stored data; and the first-order component reduction processing can be performed. Therefore, it is not necessary to always calculate the first-order component extraction value by performing the first-order component extraction processing, and to correct the first system output signal by the calculated first-order component extraction value. Since the stored data stored in the past is used, compared with a case where a statistical processing value calculated in real time is used, an influence of a phase delay caused by the statistical processing can be eliminated.

In the present embodiment, the statistical processing is an average processing. As shown in FIG. 22, the first system first-order component reduction processing unit 54A calculates the two first-order component extraction values V1A_1ST, V2A_1ST, by performing the average processing to a plurality of two output signals V1A_F, V2A_F each of which was calculated in a statistical processing period ΔTave centering on each of a plurality of preliminarily set angles θM1 in the mechanical angle. The plurality of angles θM1 in the mechanical angles at each of which the statistical processing is performed are set to angles obtained by subdividing an angle θM1 from 0 to 2π in the mechanical angle by an angle interval ΔθM. In FIG. 22, ΔθM is set to 36 degrees, and the average processing is performed in the statistical processing period ΔTave centering on each of 10 angles θM1 in the mechanical angle.

Figures 23, 24, 25:
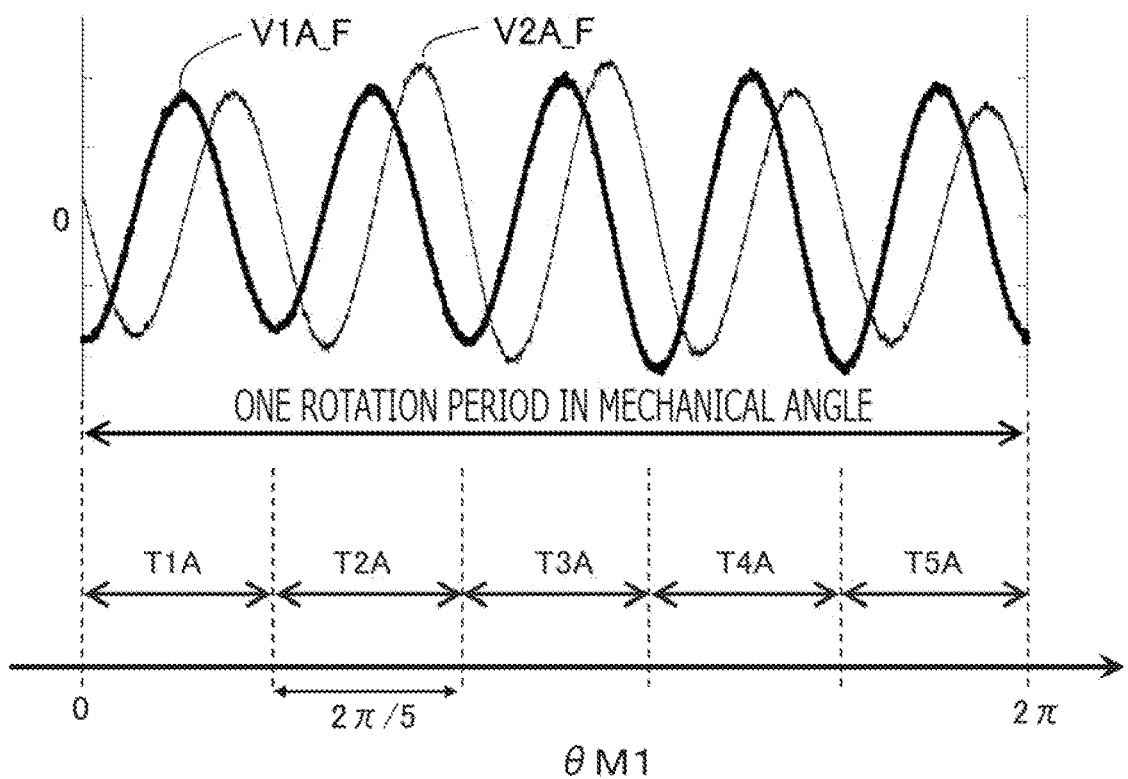
FIG. 23 is a figure explaining the stored data of the first system first-order component extraction values according to Embodiment 2.
FIG. 24 is a figure for explaining the first system first-order component extraction processing according to Embodiment 2.
FIG. 25 is a figure explaining the stored data of the first system first-order component extraction values according to Embodiment 2.

Then, as shown in FIG. 23, the first system first-order component reduction processing unit 54A stores a table data between each of the plurality of angles θM1 in the mechanical angle, and the first-order component extraction values V1A_1STMM, V2A_1STMM calculated in the statistical processing period ΔTave centering on each angle θM1, to the storage apparatus 91, such as RAM.

The first system first-order component reduction processing unit 54A may calculate the first system two first-order component extraction values V1A_1ST, V2A_1ST, by performing a moving average processing in the statistical processing period ΔTave to the first system two output signals V1A_F, V2A_F; and may store the calculated first system two first-order component extraction values V1A_1STMM, V2A_1STMM, by correlating with the corresponding center angle θM1 of the statistical processing period ΔTave in the mechanical angle.

And, the first system first-order component reduction processing unit 54A may store values obtained by performing a statistical processing (for example, an average processing, a first order lag filter processing) to plural times of the first-order component extraction values V1A_1ST, V2A_1ST which were calculated at each of the plurality of angles θM1 in the mechanical angle in the past plural times of one rotation periods in the mechanical angle, as the first-order component extraction values V1A_1STMM, V2A_1STMM of each angle θM1. According to this configuration, by the statistical processing, disturbance and noise component can be reduced, and the accuracy of the stored first-order component extraction values can be improved.

<Dividing One Rotation Period by N>

The first system first-order component reduction processing unit 54A calculates the first system two first-order component extraction values V1A_1ST, V2A_1ST, by performing a statistical processing (in this example, an average processing) to the first system two output signals in the division period, at each of N division periods obtained by dividing the one rotation period in the mechanical angle by N, which are as the plurality of phases (the angle θM1); and stores N first system two first-order component extraction values calculated at each of the division periods, by correlating with the corresponding division period as the phase.

In the present embodiment, since N is set to 5, as shown in FIG. 24, the one rotation period in the mechanical angle is divided into five, and five division periods from the first division period T1A to the fifth division period T5A are provided. The first division period T1A is set to a period from 0 to 2π/5 of the angle θM1 in the mechanical angle, the second division period T2A is set to a period from 2π/5 to 4π/5, the third division period T3A is set to a period from 4π/5 to 6π/5, the fourth division period T4A is set to a period from 6π/5 to 8π/5, and the fifth division period T5A is set to a period from 8π/5 to 2π.

The first system first-order component reduction processing unit 54A calculates the two first-order component extraction values V1A_1ST, V2A_1ST, by performing the average processing to the plurality of two output signals V1A_F, V A_F which were calculated at each division period. Then, as shown in FIG. 25, the first system first-order component reduction processing unit 54A stores a table data between each of the first to the fifth division periods, and the first-order component extraction values V1A_1STMM, V2A_1STMM which were calculated at each division period, to the storage apparatus 91, such as RAM.

The first system first-order component reduction processing unit 54A may store values obtained by performing a statistical processing (for example, an average processing, a first order lag filter processing) to plural times of the first-order component extraction values V1A_1ST, V2A_1ST which were calculated at each of the N division periods in the past plural times of one rotation periods in the mechanical period, as the first-order component extraction values V1A_1STMM, V2A_1STMM of each division period. According to this configuration, by the statistical processing, disturbance and noise component can be reduced, and the accuracy of the stored first-order component extraction values can be improved.

The first system first-order component reduction processing unit 54A reads the first system two first-order component extraction values V1A_1STMM, V2A_1STMM corresponding to the present division period, by referring to the five first system two first-order component extraction values V1A_1STMM, V2A_1STMM stored by correlating with the division period; and calculates first system two output signals V1A_F*, V2A_F* after the first-order component reduction processing, by subtracting the read first system two first-order component extraction values V1A_1STMM, V2A_1STMM from the present first system two output signals V1A_F, V2A_F, respectively.

The first system first-order component reduction processing unit 54A determines the present division period, based on the angle θM1 of the one rotation period in the mechanical angle calculated based on the first angle θ1 in the electrical angle.

Figure 26:
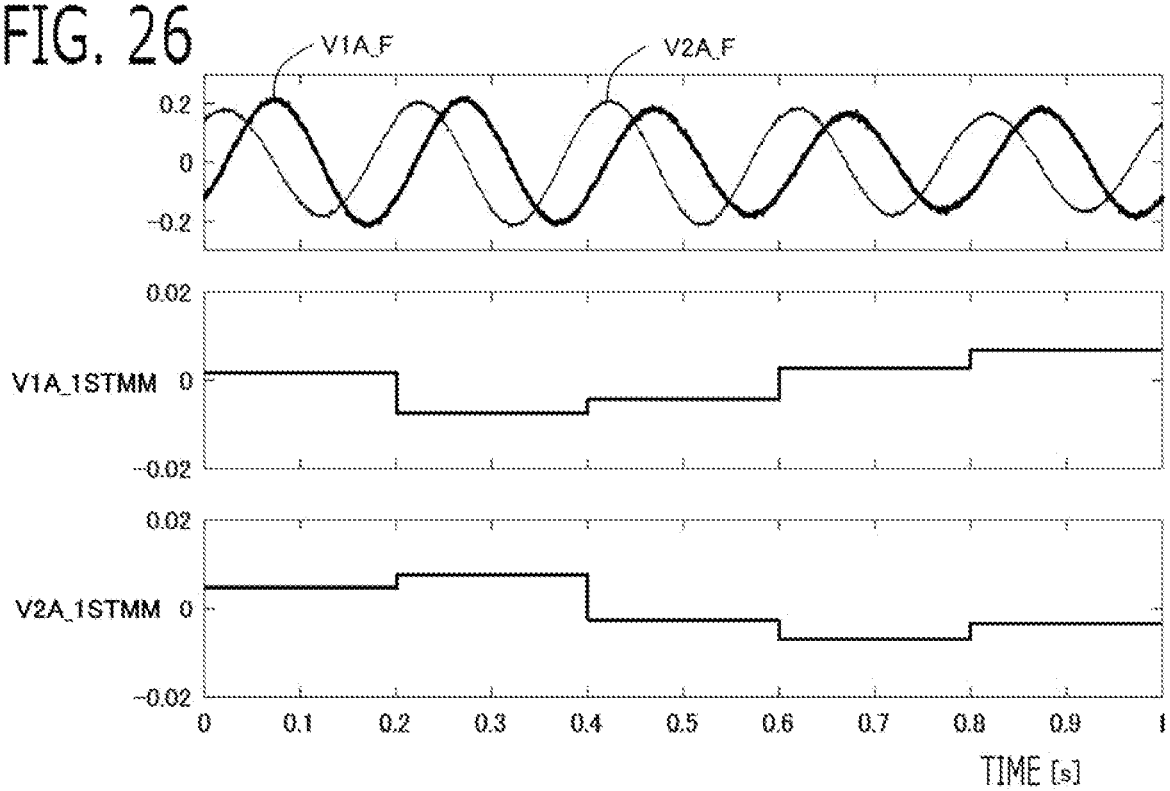
FIG. 26 is a time chart explaining the calculation behavior of the first system first-order component extraction value according to Embodiment 2.

FIG. 26 shows a control behavior. In each of the first division period T1A to the fifth division period T5A, the corresponding first first-order component extraction value V1A_1STMM and the corresponding second first-order component extraction value V2A_1STMM are read from the table data. In the table data, the first-order component extraction values calculated in the previous one rotation period is stored.

Figure 27:
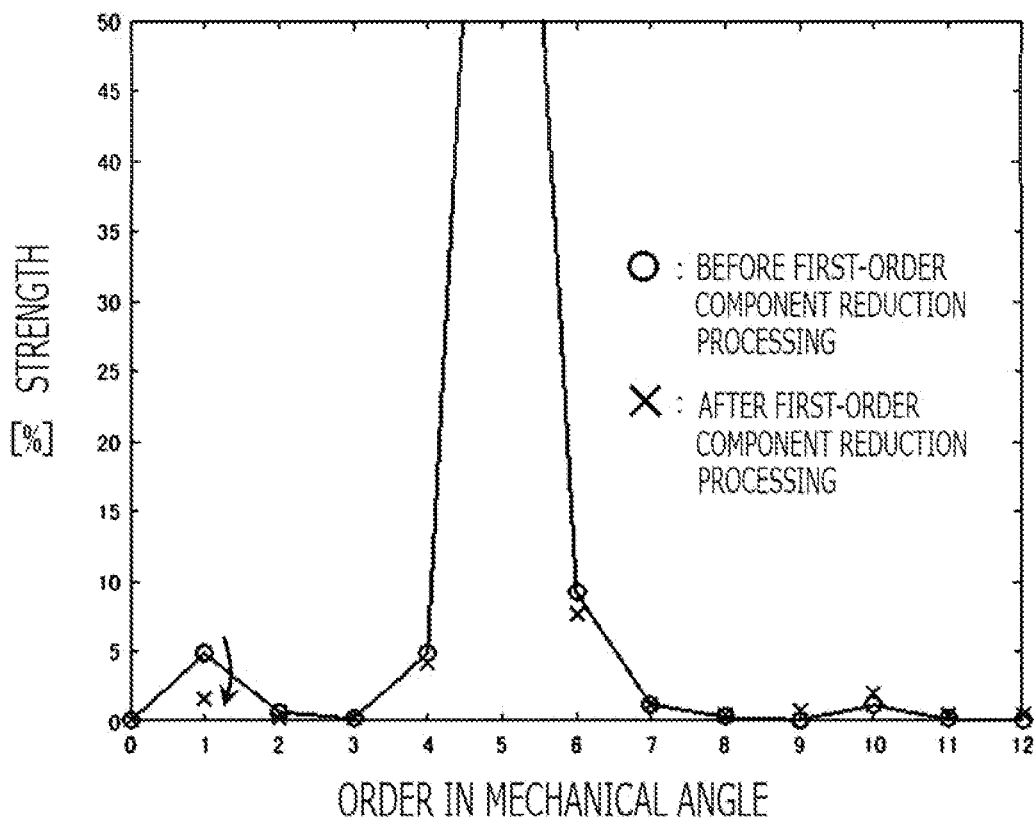
FIG. 27 is a figure showing the frequency analysis result of the first system two output signals before and after the first-order component reduction processing according to Embodiment 2.

FIG. 27 shows a frequency analysis result of the first output signal V1A_F before the first-order component reduction processing, and the first output signal V1A_F* after the first-order component reduction processing. While the first-order component in the mechanical angle is caused 4.8% before the first-order component reduction processing, it is reduced to 1.5% after the first-order component reduction processing. Therefore, the first-order component in the mechanical angle which is caused due to the eccentricity can be reduced about 70% by the first-order component reduction processing, and the fourth and sixth error components of the first angle θ1 can be reduced about 70%.

<Storage Condition>

When a preliminarily set storage condition is established, the first system first-order component reduction processing unit 54A calculates the two first-order component extraction values V1A_1ST, V2A_1ST by performing the statistical processing (in this example, the average processing); and stores the calculated two first-order component extraction values V1A_1STMM, V2A_1STMM by correlating with the corresponding angle θM1 or the corresponding division period.

According to this configuration, in the storage condition where the extraction precision of the first-order component extraction values caused by the eccentricity become high, by calculating the first-order component extraction values, and storing the first-order component extraction values by correlating with the phase, the accuracy of the stored first-order component extraction values can be improved.

The first system first-order component reduction processing unit 54A determines that storage condition is established when the first angular speed ω1 is larger than a preliminarily set speed threshold value ωth; and determines that the storage condition is not established when the first angular speed ω1 is less than or equal to the speed threshold value ωth.

In the present embodiment, the setting method of the speed threshold value ωth is different from Embodiment 1. In the present embodiment, the statistical processing (in this example, the average processing) in a period obtained by dividing the one rotation period in the mechanical angle by N is performed. Accordingly, a component due to an actual angular variation in a period shorter than 1/N of the one rotation period in the mechanical angle is reduced by the first-order component reduction processing. Therefore, a frequency due to the actual angular variation reduced by the first-order component reduction processing becomes N times of that of the Embodiment 1. Accordingly, when the angular speed is 1/N of that of Embodiment 1, the frequency of the actual angular variation reduced by the first-order component reduction processing becomes the same as that of Embodiment 1. Therefore, the speed threshold value ωth can also be set to 1/N of that of Embodiment 1. For example, if the maximum frequency of the actual angular variation is 50 Hz in the mechanical angle, the speed threshold value ωth is set to an angular speed corresponding to a frequency of ⅕ of 50 Hz. Therefore, in the present embodiment, the speed threshold value ωth can be set to ⅕ compared with Embodiment 1, and an angular speed range where the storage condition is established can be expanded. If N is greater than or equal to two, the angular speed range where the storage condition is established can be expanded more than that of Embodiment 1. Then, since the first-order component extraction value is stored on the condition where the variation component of the actual angle included in the first-order component extraction value decreases, the accuracy of the first-order component extraction value can be improved.

<Block Diagram According to Storage and Read of First-Order Component Extraction Value>

Figure 28:
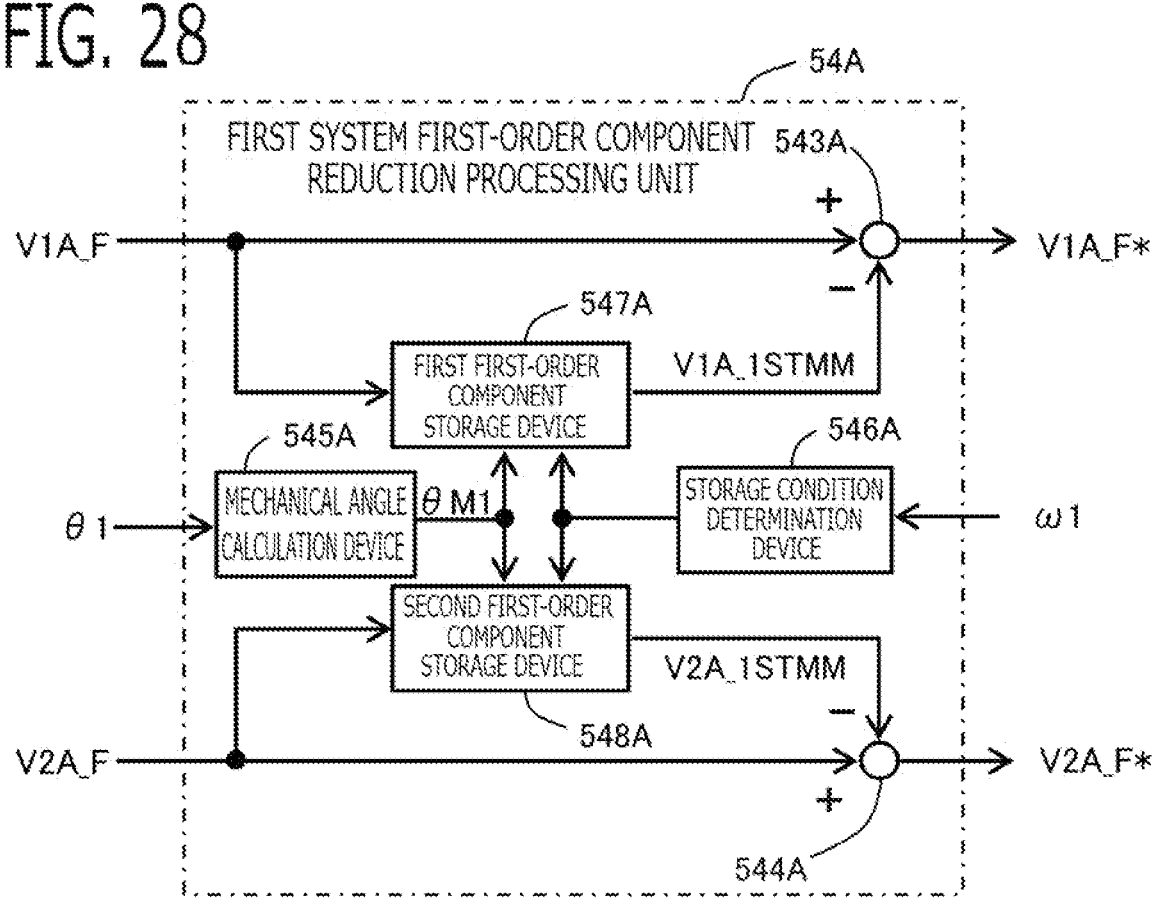
FIG. 28 is a block diagram of the first system first-order component reduction processing unit according to Embodiment 2.

In the present embodiment, as shown in FIG. 28, the first system first-order component reduction processing unit 54A is provided with a first subtractor 543A, a second subtractor 544A, a mechanical angle calculation device 545A, a storage condition determination device 546A, a first first-order component storage device 547A, and a second first-order component storage device 548A.

As mentioned above, the mechanical angle calculation device 545A calculates the angle θM1 in the mechanical angle, based on the first angle θ1. As mentioned above, the storage condition determination device 546A determines whether the storage condition is established, based on the first angular speed ω1.

As mentioned above, when the storage condition is established, the first first-order component storage device 547A calculates the first first-order component extraction value V1A_1ST at each of the plurality of angles θM1 or the N division periods by performing the statistical processing to the first output signals V1A_F in the statistical processing period or the division period; and stores the plurality of first first-order component extraction values V1A_1STMM calculated at each of the angle θM1 or the division period by correlating with the corresponding angle θM1 or the corresponding division period. And, the first first-order component storage device 547A refers to the plurality of first first-order component extraction values V1A_1STMM stored by correlating with the angle θM1 or the division period; and reads and outputs the first first-order component extraction value V1A_1STMM corresponding to the present angle θM1 or the present division period. Then, the first subtractor 543A calculates the first output signal V1A_F* after the first-order component reduction processing by subtracting the first first-order component extraction value V1A_1STMM from the present first output signal V1A_F.

As mentioned above, when the storage condition is established, the second first-order component storage device 548A calculates the second first-order component extraction value V2A_1ST at each of the plurality of angles θM1 or the N division periods by performing the statistical processing to the second output signals V2A_F in the statistical processing period or the division period; and stores the plurality of second first-order component extraction values V2A_1STMM calculated at each of the angle θM1 or the division period by correlating with the corresponding angle θM1 or the corresponding division period. And, the second first-order component storage device 548A refers to the plurality of second first-order component extraction values V2A_1STMM stored by correlating with the angle θM1 or the division period; and reads and outputs the second first-order component extraction value V2A_1STMM corresponding to the present angle θM1 or the present division period. Then, the second subtractor 544A calculates the second output signal V2A_F* after the first-order component reduction processing by subtracting the second first-order component extraction value V2A_1STMM from the present second output signal V2A_F.

2-2. Second System First-Order Component Reduction Processing Unit

In the present embodiment, in the first-order component reduction processing, the second system first-order component reduction processing unit 54B calculates the second system two first-order component extraction values V1B_1ST, V2B_1ST by performing a statistical processing to the second system two output signals V1B_F, V2B_F in a statistical processing period ΔTave obtained by dividing a time of the one rotation period in the mechanical angle by N, at each of a plurality of phases (angle θM2) of the one rotation period in the mechanical angle; and stores the plurality of the second system two first-order component extraction values V1B_1STMM, V2B_1STMM calculated at each phase (angle θM2), by correlating with the corresponding phase.

Similarly to Embodiment 1, the second system first-order component reduction processing unit 54B calculates the angle θM2 (phase) of the one rotation period in the mechanical angle, based on the second angle θ2 in the electrical angle.

The second system first-order component reduction processing unit 54B reads the second system two first-order component extraction values V1B_1STMM, V2B_1STMM corresponding to the present phase, by referring to the plurality of second system two first-order component extraction values V1B_1STMM, V2B_1STMM stored by correlating with the phase; and calculates second system two output signals V1B_F*, V2B_F* after the first-order component reduction processing, by subtracting the read second system two first-order component extraction values V1B_1STMM, V2B_1STMM from the present second system two output signals V1B_F, V2B_F, respectively.

In the present embodiment, the statistical processing is an average processing. The second system first-order component reduction processing unit 54B calculates the two first-order component extraction values V1B_1ST, V2B_1ST, by performing the average processing to a plurality of two output signals V1B_F, V2B_F each of which was calculated in a statistical processing period ΔTave centering on each of a plurality of preliminarily set angles θM2 in the mechanical angle. The plurality of angles θM2 in the mechanical angles at each of which the statistical processing is performed are set to angles obtained by subdividing an angle θM2 from 0 to 2π in the mechanical angle by an angle interval ΔθM.

Then, similarly to the first system, the second system first-order component reduction processing unit 54B stores a table data between each of the plurality of angles θM2 in the mechanical angle, and the first-order component extraction values V1B_1STMM, V2B_1STMM calculated in the statistical processing period ΔTave centering on each angle θM2, to the storage apparatus 91, such as RAM.

<Dividing One Rotation Period by N>

The second system first-order component reduction processing unit 54B calculates the second system two first-order component extraction values V1B_1ST, V2B_1ST, by performing a statistical processing (in this example, an average processing) to the second system two output signals in the division period, at each of N division periods obtained by dividing the one rotation period in the mechanical angle by N, which are as the plurality of phases (the angle θM2); and stores N second system two first-order component extraction values calculated at each of the division periods, by correlating with the corresponding division period as the phase.

In the present embodiment, since N is set to 5, similarly to the first system, the one rotation period in the mechanical angle is divided into five, and five division periods from the first division period to the fifth division period are provided.

The second system first-order component reduction processing unit 54B calculates the two first-order component extraction values V1B_1ST, V2B_1ST, by performing the average processing to the plurality of two output signals V1B_F, V2B_F which were calculated at each division period. Then, the second system first-order component reduction processing unit 54B stores a table data between each of the first to the fifth division periods, and the first-order component extraction values V1B_1STMM, V2B_1STMM which were calculated at each division period, to the storage apparatus 91, such as RAM.

Then, the second system first-order component reduction processing unit 54B reads the second system two first-order component extraction values V1B_1STMM, V2B_1STMM corresponding to the present division period, by referring to the five second system two first-order component extraction values V1B_1STMM, V2B_1STMM stored by correlating with the division period; and calculates second system two output signals V1B_F*, V2B_F* after the first-order component reduction processing, by subtracting the read second system two first-order component extraction values V1B_1STMM, V2B_1STMM from the present second system two output signals V1B_F, V2B_F, respectively.

The second system first-order component reduction processing unit 54B determines the present division period, based on the angle θM2 of the one rotation period in the mechanical angle calculated based on the second angle θ2 in the electrical angle.

<Storage Condition>

When a preliminarily set storage condition is established, the second system first-order component reduction processing unit 54B calculates the two first-order component extraction values V1B_1ST, V2B_1ST by performing the statistical processing (in this example, the average processing); and stores the calculated two first-order component extraction values V1B_1STMM, V2B_1STMM by correlating with the corresponding angle θM2 or the corresponding division period.

The second system first-order component reduction processing unit 54B determines that storage condition is established when the second angular speed ω2 is larger than a preliminarily set speed threshold value ωth; and determines that the storage condition is not established when the second angular speed ω2 is less than or equal to the speed threshold value ωth. The speed threshold value ωth is set similarly to the first system.

<Block Diagram According to Storage and Read of First-Order Component Extraction Value>

Figure 29:
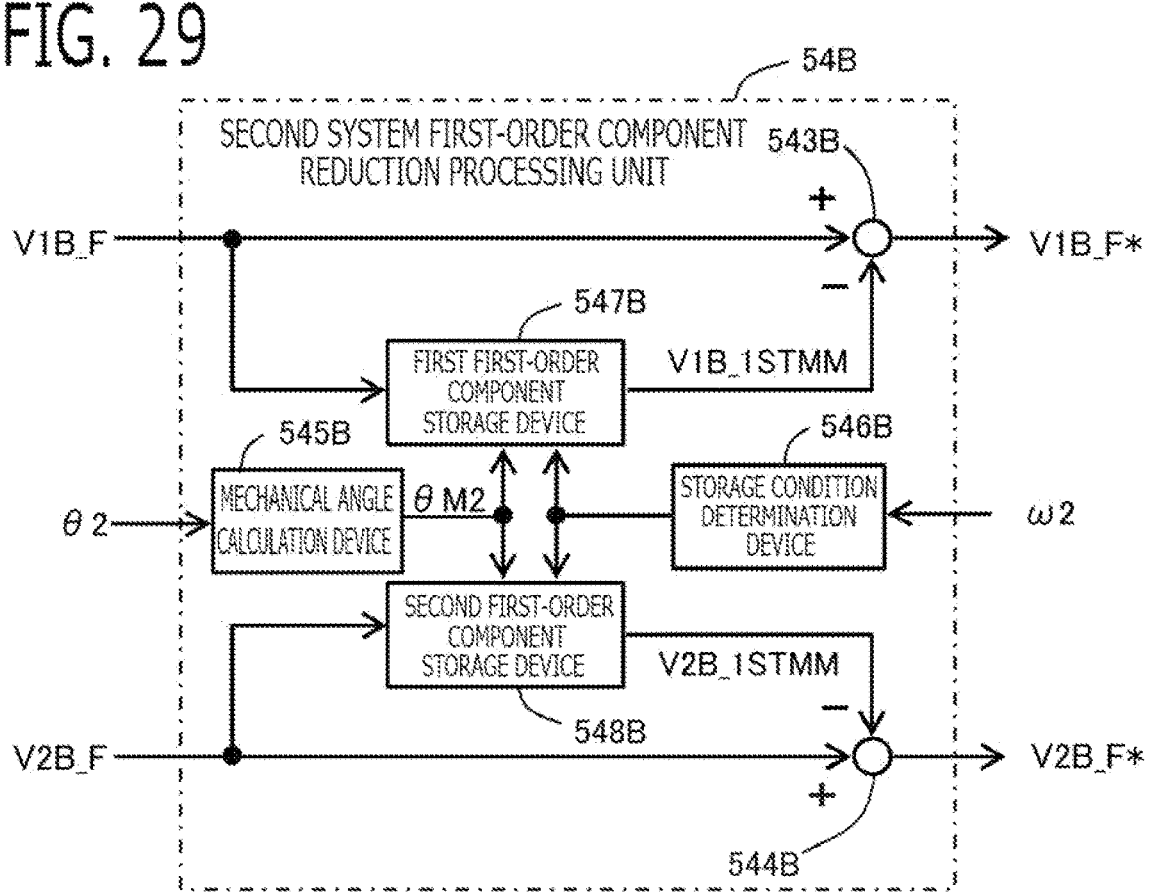
FIG. 29 is a block diagram of the second system first-order component reduction processing unit according to Embodiment 2.

In the present embodiment, as shown in FIG. 29, the second system first-order component reduction processing unit 54B is provided with a first subtractor 543B, a second subtractor 544B, a mechanical angle calculation device 545B, a storage condition determination device 546B, a first first-order component storage device 547B, and a second first-order component storage device 548B.

As mentioned above, the mechanical angle calculation device 545B calculates the angle θM2 in the mechanical angle, based on the second angle θ2. As mentioned above, the storage condition determination device 546B determines whether the storage condition is established, based on the second angular speed ω2.

As mentioned above, when the storage condition is established, the first first-order component storage device 547B calculates the first first-order component extraction value V1B_1ST at each of the plurality of angles θM2 or the N division periods by performing the statistical processing to the first output signals V1B_F in the statistical processing period or the division period; and stores the plurality of first first-order component extraction values V1B_1STMM calculated at each of the angle θM2 or the division period by correlating with the corresponding angle θM2 or the corresponding division period. And, the first first-order component storage device 547B refers to the plurality of first first-order component extraction values V1B_1STMM stored by correlating with the angle θM2 or the division period; and reads and outputs the first first-order component extraction value V1B_1STMM corresponding to the present angle θM2 or the present division period. Then, the first subtractor 543B calculates the first output signal V1B_F* after the first-order component reduction processing by subtracting the first first-order component extraction value V1B_1STMM from the present first output signal V1B_F.

As mentioned above, when the storage condition is established, the second first-order component storage device 548B calculates the second first-order component extraction value V2B_1ST at each of the plurality of angles θM2 or the N division periods by performing the statistical processing to the second output signals V2B_F in the statistical processing period or the division period; and stores the plurality of second first-order component extraction values V2B_1STMM calculated at each of the angle θM2 or the division period by correlating with the corresponding angle θM1 or the corresponding division period. And, the second first-order component storage device 548B refers to the plurality of second first-order component extraction values V2B_1STMM stored by correlating with the angle θM2 or the division period; and reads and outputs the second first-order component extraction value V2B_1STMM corresponding to the present angle θM2 or the present division period. Then, the second subtractor 544B calculates the second output signal V2B_F* after the first-order component reduction processing by subtracting the second first-order component extraction value V2B_1STMM from the present second output signal V2B_F.

2-3. Electric Power Steering Apparatus

Figure 30:
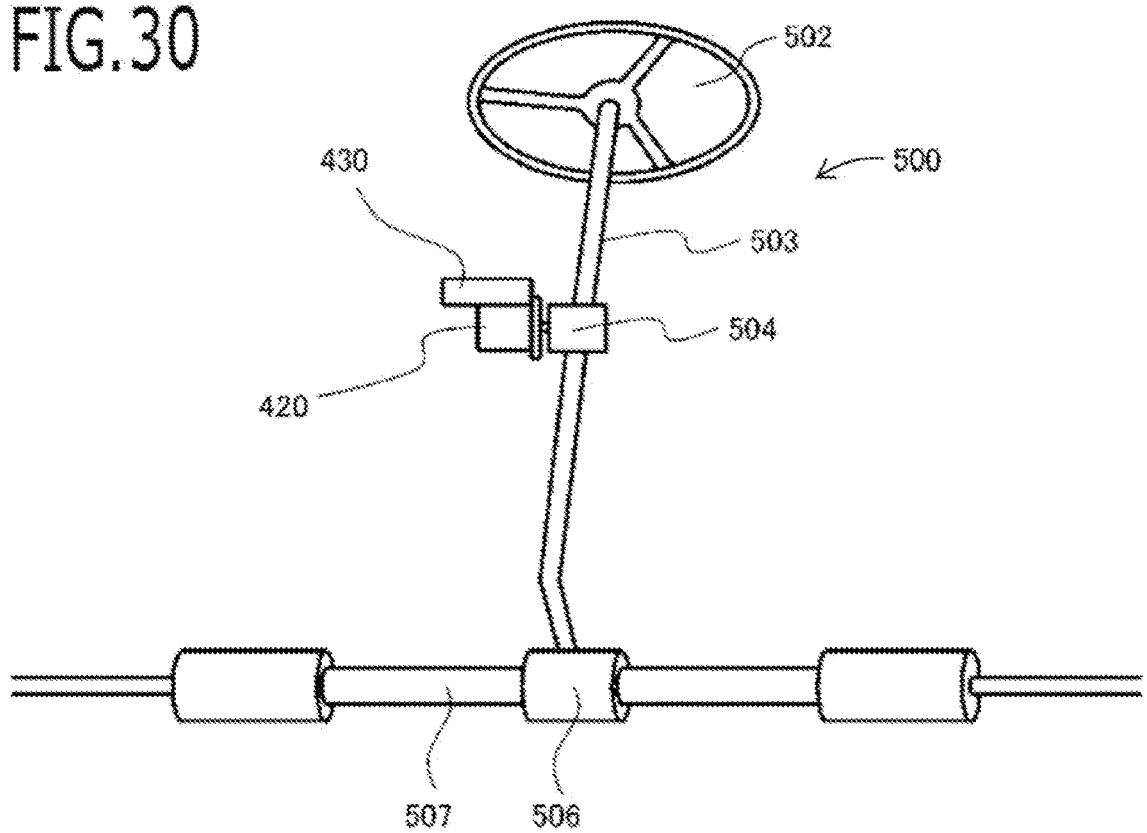
FIG. 30 is a schematic configuration diagram of the electric power steering apparatus according to Embodiment 2.

Next, a case where the detected object of the angle is a driving motor of an electric power steering apparatus 500 is considered. FIG. 30 shows a schematic configuration diagram of the electric power steering apparatus 500. The electric power steering apparatus 500 is provided with a column shaft 503 which transmits a steering force of steering wheels 502 by a driver. Gears 504, such as a worm gear, are connected to the column shaft 503, for example. The gears 504 changes a rotation direction of a rotational driving force (torque, rotation) of the driving motor 420 perpendicularly and decelerates it; and transmits it to the column shaft 503 and assists. A driving motor 420 is a permanent-magnet type motor, and is controlled by a controller 430. A steering gear 506 reduces rotation of the column shaft 503 and converts it into a linear motion; and moves a rack 507 in a linear direction. The angle of the wheels is changed by this linear motion of the rack 507.

As an angle detection apparatus of the driving motor 420, the resolver which is low cost and excellent in environment resistance compared with the optical encoder is used in many cases. However, if the angle error occurs in the resolver due to the eccentricity, the torque ripple of an order according to an order of the angle error occurs, it becomes a cause of noise, and a steering sense is deteriorated.

The effectiveness of the angle detection apparatus according to the present embodiment will be explained. According to the nonpatent literature (Kurishige et al. "A New Control Strategy to Reduce Steering Torque for Vehicles Equipped with Electric Power Steering", Transactions of the Japan Society of Mechanical Engineers. C, 68 No. 675), it is described that the steering wheel vibration occurs in the vicinity of the frequency of 50 Hz. Therefore, if the steering wheel 502 vibrates at 50 Hz, vibration of its frequency occurs also in the driving motor 420 which assists the steering wheel 502. Therefore, if the angle detection apparatus of Embodiment 1 is used, the speed threshold value ωth is set greater than or equal to an angular speed corresponding to 50 Hz. If the speed threshold value ωth of Embodiment 1 is expressed by rpm in the mechanical angle, it becomes 3000 rpm or more. On the other hand, the rated rotational speed of the driving motor 420 is about 100 rpm; and in the rotational speed greater than or equal to it, energization of the negative d-axis current by the magnetic flux weakening control is performed. If the angle error Δθ exists in the first angle θ1 or the second angle θ2, the d-axis current is varied and the torque error ΔT occurs. The torque error ΔT can be approximated by Kt×Id×sin(Δθ). Herein, Kt is a torque constant and Id is a d-axis current. Accordingly, if the angle error Δθ pulsates, the torque error ΔT also pulsates. Therefore, it becomes a cause of deterioration of steering sense and strange noise.

Therefore, it is preferred that the angle error Δθ due to the eccentricity is reduced before energizing the negative d-axis current, that is, below the rated rotational speed. Since the speed threshold value ωth of Embodiment 1 is set to 3000 rpm or more, the first-order component extraction value is not calculated and stored in 1000 rpm to 3000 rpm where the torque error ΔT due to the d-axis current occurs. Accordingly, the angle error Δθ due to the eccentricity is not reduced, but the steering sense may be deteriorated by the torque error ΔT, and the strange noise may occur.

On the other hand, since the speed threshold value ωth of Embodiment 2 can be set to 1/N of the speed threshold value ωth of Embodiment 1; if N is 5, the speed threshold value can be set to 3000 rpm/5=600 rpm, expressed by rpm in the mechanical angle; if N is 4, the speed threshold value can be set to 3000 rpm/4-750 rpm; and if N is 3, the speed threshold value can be set to 3000 rpm/3=1000 rpm. Therefore, if the number of salient poles N is three or more, since the first-order component extraction value is calculated and stored in 1000 rpm or more where the torque error ΔT due to the d-axis current occurs, the angle error Δθ due to the eccentricity can be reduced, deterioration of the steering sense and occurrence of the strange noise due to the torque error ΔT can be suppressed.

Therefore, using the angle detection apparatus of Embodiment 2 in which the number of salient poles N is set to three or more, in the electric power steering apparatus, occurrence of the torque variation due to the eccentricity can be suppressed, and deterioration of the steering sense and occurrence of the strange noise can be suppressed.

Other Embodiments

In each of the above-mentioned embodiments, there was explained the case where the stator 13 had 12 tooth from the first teeth TE1 to the twelfth teeth TE12. However, the number of tooth of the stator 13 may be a number other than 12, for example, 14, or 16.

The stator 13 may be provided with windings of two or more systems (for example, windings of three systems). Like the patent documents 1 and 2, the windings of two systems may be divided into 4 and may be provided in the stator 13. The windings of two systems are divided into a natural number multiple of even number, such as six division and eight division, and may be provided in the stator 13. The number of salient poles N is not limited to 5, and may be set to any natural numbers. In Embodiment 2, the number of salient poles N may be three or more.

If the influence of the magnetic interference between the first system and the second system is small, the first system second period reduction processing unit 53A and the second system first period reduction processing unit 53B may be omitted. The first period TA and the second period TB may be coincided.

About the influence of the magnetic interference, in FIG. 16 of the patent document 1, the excitation signal of the first system and the excitation signal of the second system are the same periods, and it is shown that the angle error is small if the phase difference is small. Therefore, by making the phase difference small, the angle error resulting from the magnetic interference can be made small. Therefore, in each of above embodiments, if the AC voltage VRA applied to the first system excitation winding 10A and the AC voltage VRB applied to the second system excitation winding 10B are set to the same periods and the same phases, the first system second period reduction processing unit 53A and the second system first period reduction processing unit 53B may be omitted.

In each of the above-mentioned embodiments, there was explained the case where in the first system, the first-order component reduction processing is performed after the second period reduction processing; and in the second system, the first-order component reduction processing is performed after the first period reduction processing. However, in the first system, the second period reduction processing may be performed after the first-order component reduction processing; and in the second system, the first period reduction processing may be performed after the first-order component reduction processing.

Each part of the first system is provided, but each part of the second system may not be provided. Even in this case, the angle error of the first system due to the eccentricity can be reduced by the first-order component reduction processing. In this case, since the magnetic interference between systems does not occur, the first system second period reduction processing unit 53A may not be provided in the first system.

The first system and the second system may be replaced. That is to say, the first system of each of above embodiments may be set to the second system; and the second system of each of above embodiments may be set to the first system.

At least, the angle error of the first system due to the eccentricity can be reduced, the second system first-order component reduction processing unit 54B may not be provided, and the angle error of the second system due to the eccentricity may not be reduced.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1 Resolver, 10A First system excitation winding, 10B Second system excitation winding, 13 Stator, 14 Rotor, 111A, 112A First system two output windings, 111B, 112B First system two output windings, 51A First system excitation unit, 52A First system output signal detection unit, 53A First system second period reduction processing unit, 54A First system first-order component reduction processing unit, 55A First system angle calculation unit, 56A First system rotational speed calculation unit, 51B Second system excitation unit, 52B Second system output signal detection unit, 53B Second system first period reduction processing unit, 54B Second system first-order component reduction processing unit, 55B Second system angle calculation unit, 56B Second system rotational speed calculation unit, N Number of salient poles, TA First period, TB Second period, VRA AC voltage of first period, VRB AC voltage of second period, V1A_1ST, V2A_1ST First system two first-order component extraction values, V1B_1ST, V2B_1ST Second system two first-order component extraction values, ΔTave Statistical processing period, θ1 First angle, θ2 Second angle, ω1 First angular speed, ωth Speed threshold value

What is claimed is:

1. An angle detection apparatus comprising:
a resolver that is provided with a stator which is provided with a first system excitation winding and first system two output windings, and a rotor which is provided with a salient pole;
a first system exciter that applies AC voltage of a first period to the first system excitation winding;
a first system output signal detector that detects periodically first system two output signals which are output signals of the first system two output windings at a preliminarily set detection timing;
a first system first-order component reduction processor that performs a first-order component reduction processing which reduces a first-order component which is a component of one rotation period in a mechanical angle of the rotor, to each of the first system two output signals; and
a first system angle calculator that calculates a first angle of the rotor, based on the first system two output signals to which the first-order component reduction processing was performed,
wherein in the first-order component reduction processing, the first system first-order component reduction processor calculates first system two first-order component extraction values by performing a first-order component extraction processing which extracts the first-order component, to each of the first system two output signals, and
wherein, in the first-order component reduction processing, the first system first-order component reduction processor calculates first system two output signals after the first-order component reduction processing by subtracting the first system two first-order component extraction values from the first system two output signals, respectively.

2. The angle detection apparatus according to claim 1, wherein the first-order component extraction processing is a band pass filter processing which passes the first-order component.

3. The angle detection apparatus according to claim 1, further comprising:
a second system excitation winding and second system two output windings which are provided in the stator,
a second system exciter that applies the AC voltage of a second period different from the first period, to the second system excitation winding;
a second system output signal detector that detects periodically second system two output signals which are output signals of the second system two output windings at preliminarily set detection timing;
a second system first-order component reduction processor that performs the first-order component reduction processing to the second system two output signals; and
a second system angle calculator that calculates a second angle of the rotor, based on the second system two output signals to which the first-order component reduction processing was performed.

4. The angle detection apparatus according to claim 3, further comprising:
a first system second period reduction processor that performs a second period reduction processing which reduces a component of the second period, to the first system two output signals; and
a second system first period reduction processor that performs a first period reduction processing which reduces a component of the first period, to the second system two output signals,
wherein the first system angle calculator calculates the first angle, based on the first system two output signals to which the first-order component reduction processing and the second period reduction processing were performed, and
wherein the second system angle calculator calculates the second angle, based on the second system two output signals to which the first-order component reduction processing and the first period reduction processing were performed.

5. An angle detection apparatus comprising:
a resolver that is provided with a stator which is provided with a first system excitation winding and first system two output windings, and a rotor which is provided with a salient pole;
a first system exciter that applies AC voltage of a first period to the first system excitation winding;

a first system output signal detector that detects periodically first system two output signals which are output signals of the first system two output windings at a preliminarily set detection timing;

a first system first-order component reduction processor that performs a first-order component reduction processing which reduces a first-order component which is a component of one rotation period in a mechanical angle of the rotor, to each of the first system two output signals; and a first system angle calculator that calculates a first angle of the rotor, based on the first system two output signals to which the first-order component reduction processing was performed, wherein in the first-order component reduction processing, the first system first-order component reduction processor calculates first system two first-order component extraction values by performing a first-order component extraction processing which extracts the first-order component, to each of the first system two output signals, wherein in the first-order component reduction processing, the first system first-order component reduction processor stores a plurality of the first system two first-order component extraction values calculated at each phase of the one rotation period, by correlating with the corresponding phase, and the first system first-order component reduction processor reads the first system two first-order component extraction values corresponding to the present phase of the one rotation period, by referring to the plurality of first system two first-order component extraction values stored by correlating with the phase; and calculates first system two output signals after the first-order component reduction processing by subtracting the read first system two first-order component extraction values from the present first system two output signals, respectively.

6. The angle detection apparatus according to claim 5, wherein when a preliminarily set storage condition is established, the first system first-order component reduction processor calculates the first system two first-order component extraction values; and stores a plurality of the calculated first system two first-order component extraction values, by correlating with the corresponding phase.

7. The angle detection apparatus according to claim 5, wherein when a preliminarily set storage condition is not established, the first system first-order component reduction processor reads the first system two first-order component extraction values corresponding to the present phase of the one rotation period, by referring to the plurality of first system two first-order component extraction values stored by correlating with the phase; and calculates first system two output signals after the first-order component reduction processing by subtracting the read first system two first-order component extraction values from the present first system two output signals, respectively, and when the preliminarily set storage condition is established, the first system first-order component reduction processor calculates first system two output signals after the first-order component reduction processing by subtracting the present first system two first-order component extraction values calculated by the first-order component extraction processing from the present first system two output signals, respectively.

8. The angle detection apparatus according to claim 6, further comprising a first system rotational speed calculator that calculates a first angular speed of the rotor based on the first angle, wherein the first system first-order component reduction processor determines that the storage condition is established when the first angular speed is larger than a preliminarily set speed threshold value, and determines that the storage condition is not established when the first angular speed is less than or equal to the speed threshold value.

9. An angle detection apparatus comprising:

a resolver that is provided with a stator which is provided with a first system excitation winding and first system two output windings, and a rotor which is provided with a salient pole;

a first system exciter that applies AC voltage of a first period to the first system excitation winding;

a first system output signal detector that detects periodically first system two output signals which are output signals of the first system two output windings at a preliminarily set detection timing;

a first system first-order component reduction processor that performs a first-order component reduction processing which reduces a first-order component which is a component of one rotation period in a mechanical angle of the rotor, to each of the first system two output signals; and a first system angle calculator that calculates a first angle of the rotor, based on the first system two output signals to which the first-order component reduction processing was performed, wherein in the first-order component reduction processing, the first system first-order component reduction processor calculates first system two first-order component extraction values by performing a first-order component extraction processing which extracts the first-order component, to each of the first system two output signals, wherein the rotor has the N salient poles (N is a natural number greater than or equal to three), and wherein in the first-order component reduction processing, the first system first-order component reduction processor calculates the first system two first-order component extraction values by performing a statistical processing to the first system two output signals in a statistical processing period obtained by dividing a time of the one rotation period by N, at each of a plurality of phases of the one rotation period; and stores a plurality of the first system two first-order component extraction values calculated at each phase, by correlating with the corresponding phase, and the first system first-order component reduction processor reads the first system two first-order component extraction values corresponding to the present phase, by referring to the plurality of first system two first-order component extraction values stored by correlating with the phase; and calculates first system two output signals after the first-order component reduction processing by subtracting the read first system two first-order component extraction values from the present first system two output signals, respectively.

10. The angle detection apparatus according to claim 9, wherein the statistical processing is an average processing.

11. The angle detection apparatus according to claim 9, further comprising a first system rotational speed calculator that calculates a first angular speed of the rotor based on the first angle, wherein the first system first-order component reduction processor determines that a preliminarily set storage condition is established when the first angular speed is larger than a preliminarily set speed threshold value, and determines that the storage condition is not established when the first angular speed is less than or equal to the speed threshold value, and when the storage condition is established, the first system first-order component reduction processor calculates the first system two first-order component extraction values; and stores a plurality of the calculated first system two first-order component extraction values, by correlating with the corresponding phase, and wherein the speed threshold value is set to an angular speed corresponding to a frequency of 1/N of a maximum frequency at which an angular variation actually occurs.

12. The angle detection apparatus according to claim 11, wherein a detected object of angle is a driving motor of an electric power steering apparatus, the maximum frequency is 50 Hz in a mechanical angle, and the speed threshold value is set to an angular speed corresponding to a frequency of 1/N of 50 Hz.

13. An angle detection apparatus comprising:

a resolver that is provided with a stator which is provided with a first system excitation winding and first system two output windings, and a rotor which is provided with a salient pole;

a first system exciter that applies AC voltage of a first period to the first system excitation winding;

a first system output signal detector that detects periodically first system two output signals which are output signals of the first system two output windings at a preliminarily set detection timing;

a first system first-order component reduction processor that performs a first-order component reduction processing which reduces a first-order component which is a component of one rotation period in a mechanical angle of the rotor, to each of the first system two output signals; and a first system angle calculator that calculates a first angle of the rotor, based on the first system two output signals to which the first-order component reduction processing was performed, wherein in the first-order component reduction processing, the first system first-order component reduction processor calculates first system two first-order component extraction values by performing a first-order component extraction processing which extracts the first-order component, to each of the first system two output signals, wherein the rotor has the N salient poles (N is a natural number greater than or equal to three), and wherein in the first-order component reduction processing, in each of N division periods obtained by dividing the one rotation period into N, the first system first-order component reduction processor calculates the first system two first-order component extraction values by performing a statistical processing to the first system two output signals in the division period; and stores the N first system two first-order component extraction values calculated at each of the division periods, by correlating with the corresponding division period as the phase, and the first system first-order component reduction processing unit processor reads the first system two first-order component extraction values corresponding to the present division period, by referring to the N first system two first-order component extraction values stored by correlating with the division period; and calculates first system two output signals after the first-order component reduction processing by subtracting the read first system two first-order component extraction values from the present first system two output signals, respectively.

* * * * *